United States Patent [19]

Hoshino et al.

[11] Patent Number: 5,243,585
[45] Date of Patent: Sep. 7, 1993

[54] OPTICAL HEAD INCLUDING FOCUSING ERROR DETECTING SYSTEM

[75] Inventors: Isao Hoshino; Yoshinori Honguh, both of Yokohama, Japan

[73] Assignee: Kabushiki Kaisha Toshiba, Kawasaki, Japan

[21] Appl. No.: 816,727

[22] Filed: Jan. 3, 1992

[30] Foreign Application Priority Data

Jan. 7, 1991 [JP] Japan .................................. 3-000257
Aug. 29, 1991 [JP] Japan .................................. 3-244413

[51] Int. Cl.$^5$ ............................................. G11B 7/12
[52] U.S. Cl. .............................. 369/44.41; 369/44.12; 369/44.23; 369/112; 250/201.5
[58] Field of Search ............... 369/44.12, 44.23, 44.37, 369/44.41, 44.42, 112, 103; 250/201.1, 201.5

[56] References Cited

U.S. PATENT DOCUMENTS

| | | | |
|---|---|---|---|
| 4,513,408 | 4/1985 | Nomura et al. | 369/44.42 |
| 4,612,437 | 9/1986 | Ohsato | 369/44.23 |
| 4,712,205 | 12/1987 | Smid et al. | 369/44.12 |
| 4,817,074 | 3/1989 | Yamanaka | 369/44.37 |
| 4,835,378 | 5/1989 | Coops | 250/201.5 |
| 4,904,856 | 2/1990 | Nagahama et al. | 369/44.23 |
| 4,929,823 | 5/1990 | Kato et al. | 369/44.37 |
| 5,062,098 | 10/1991 | Hori et al. | 369/112 |
| 5,070,493 | 12/1991 | Marshall et al. | 369/112 |
| 5,111,448 | 5/1992 | Komma et al. | 369/112 |

FOREIGN PATENT DOCUMENTS

| | | |
|---|---|---|
| 62-137736 | 6/1987 | Japan . |
| 1-10449 | 1/1989 | Japan .................................. 369/103 |
| 2-29943 | 1/1990 | Japan .................................. 369/103 |
| 2-37004 | 8/1990 | Japan . |
| 2-41092 | 9/1990 | Japan . |

Primary Examiner—Roy N. Envall, Jr.
Assistant Examiner—Jennifer L. Hazard
Attorney, Agent, or Firm—Oblon, Spivak, McClelland, Maier & Neustadt

[57] ABSTRACT

In an optical head, a converging lens and a holographic optical element are arranged in the optical path of light reflected by the recording surface of an optical memory recording medium and passing through an objective lens. The holographic optical element has a hologram formed in at least one of two regions split by a region splitting line crossing the optical axis of the converging lens. A photodetector is arranged on the extension line of the optical axis. The photodetector has a plurality of detection surfaces which are respectively split along the region partition line of the holographic optical element to detect light beams diffracted by the hologram. The optical head also includes a detecting system for detecting a focusing error of the objective lens of the optical head by performing predetermined arithmetic operations using an incorporated processing circuit on the basis of output signals obtained by the plurality of detection surfaces of the photodetector.

30 Claims, 27 Drawing Sheets

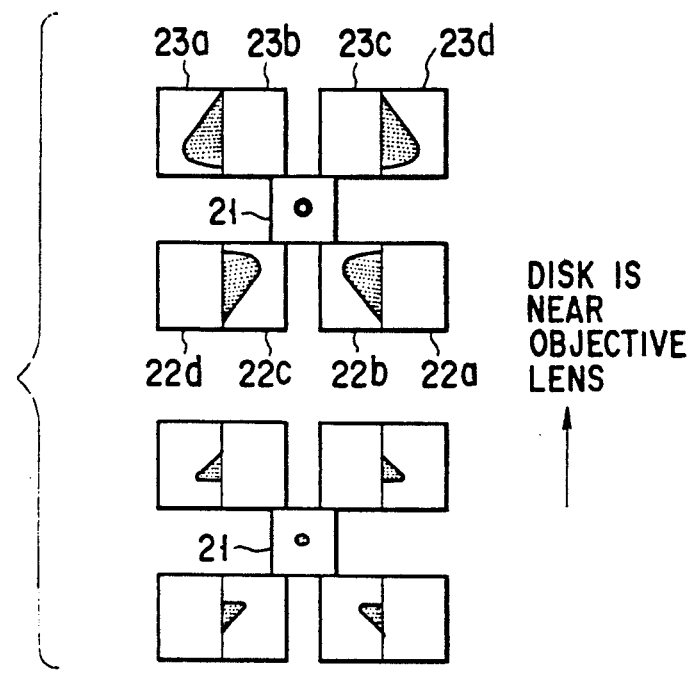
FIG. 13A  DISK IS NEAR OBJECTIVE LENS
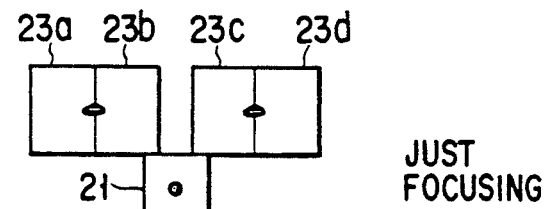
FIG. 13B  JUST FOCUSING CONDITION
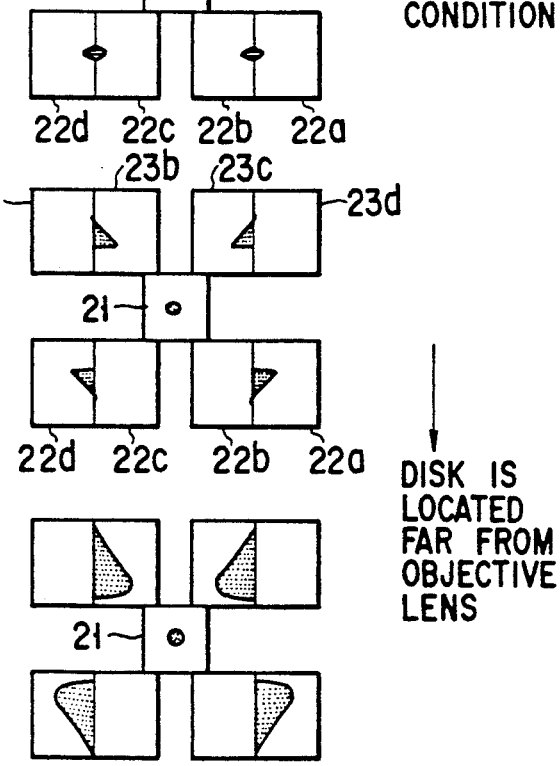
FIG. 13C  DISK IS LOCATED FAR FROM OBJECTIVE LENS

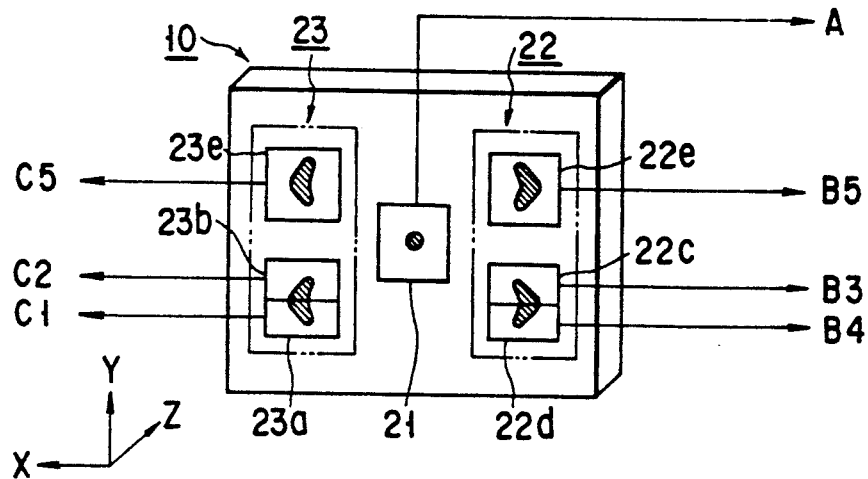
F I G. 15
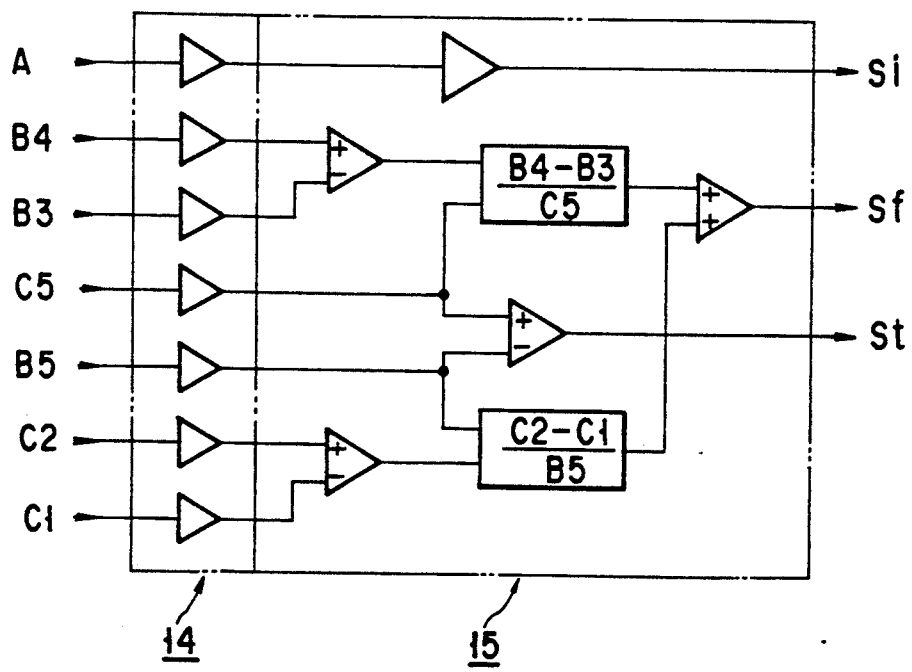
F I G. 16

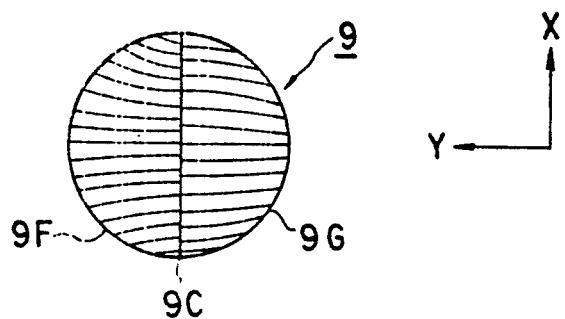
F I G. 17
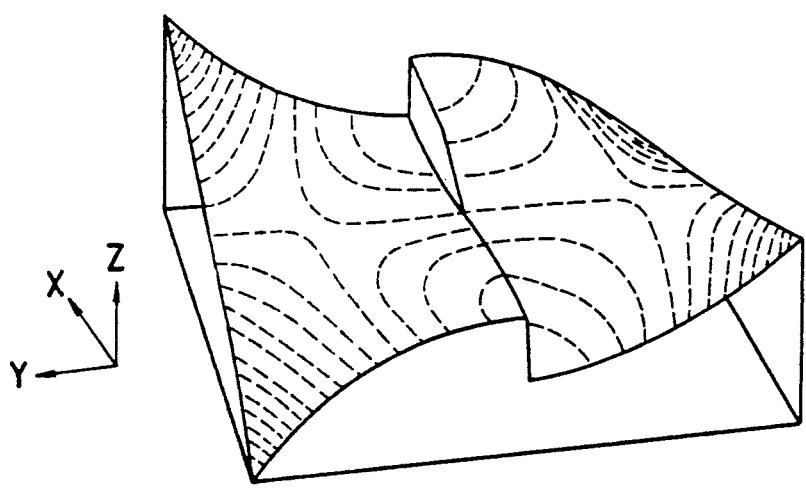
F I G. 18

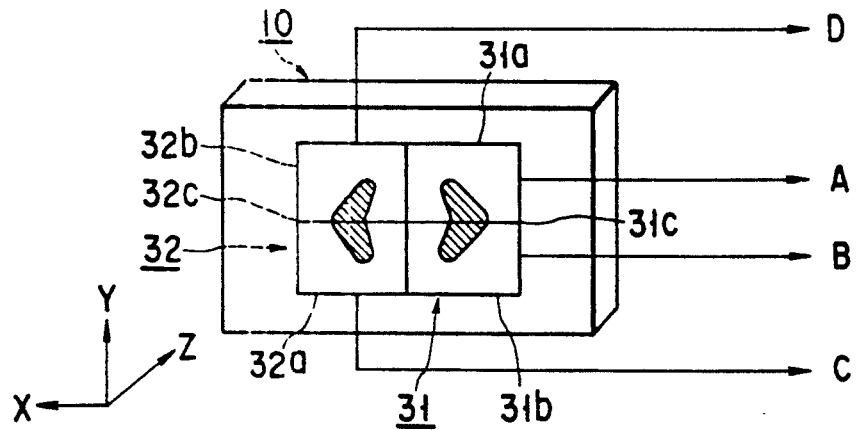
F I G. 20
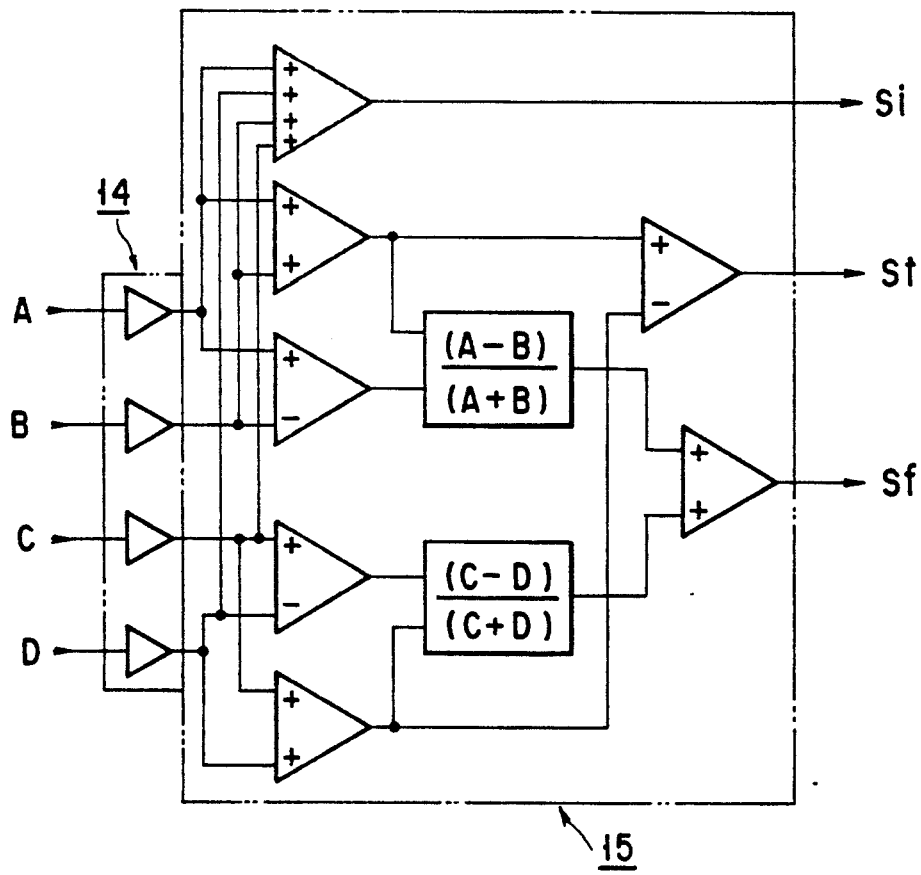
F I G. 21

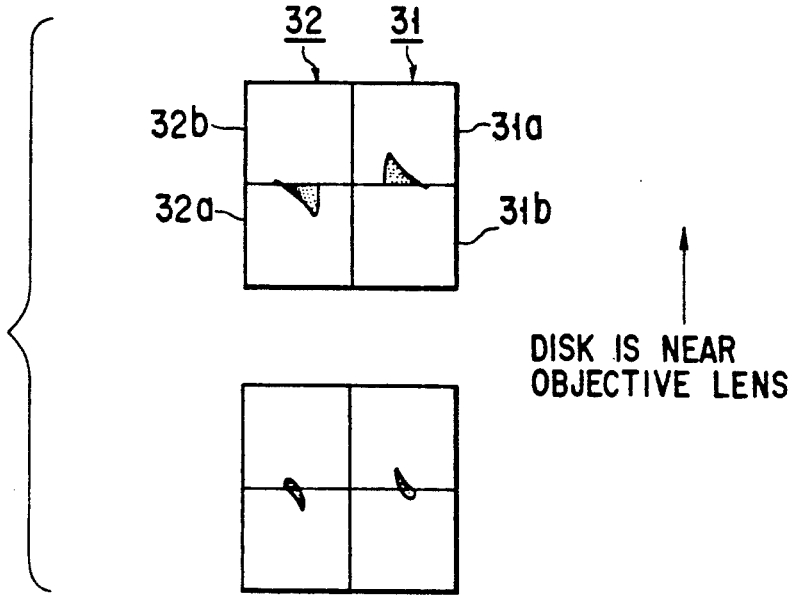
FIG. 22A — DISK IS NEAR OBJECTIVE LENS
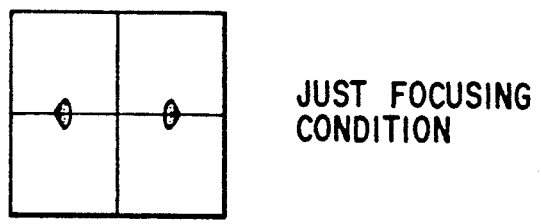
FIG. 22B — JUST FOCUSING CONDITION
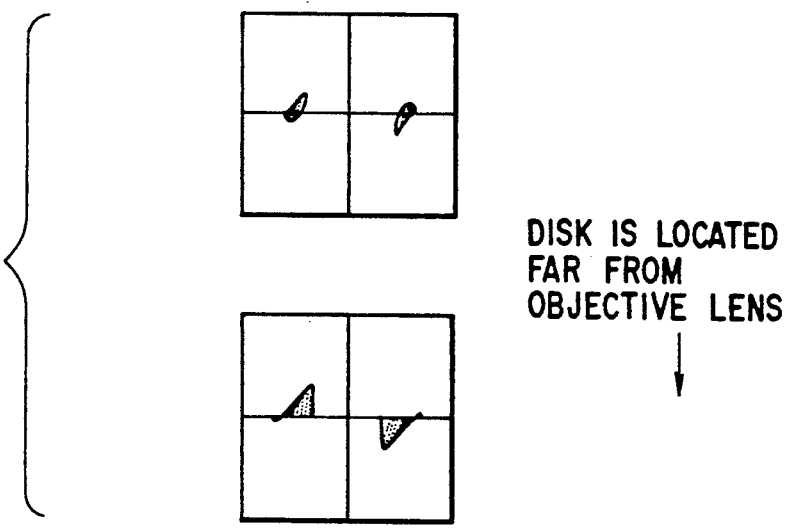
FIG. 22C — DISK IS LOCATED FAR FROM OBJECTIVE LENS

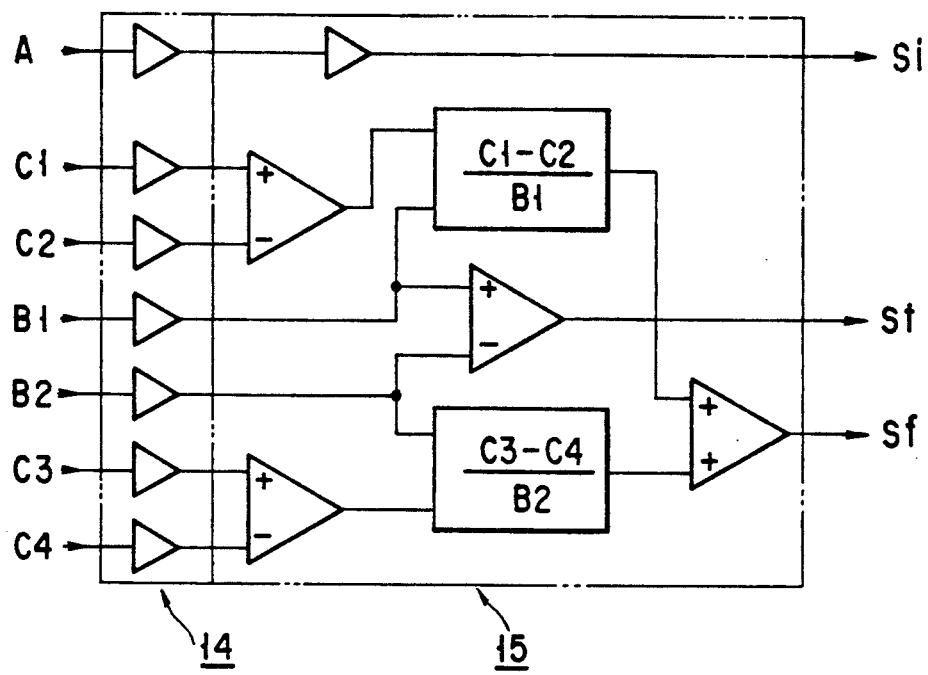
F I G. 27
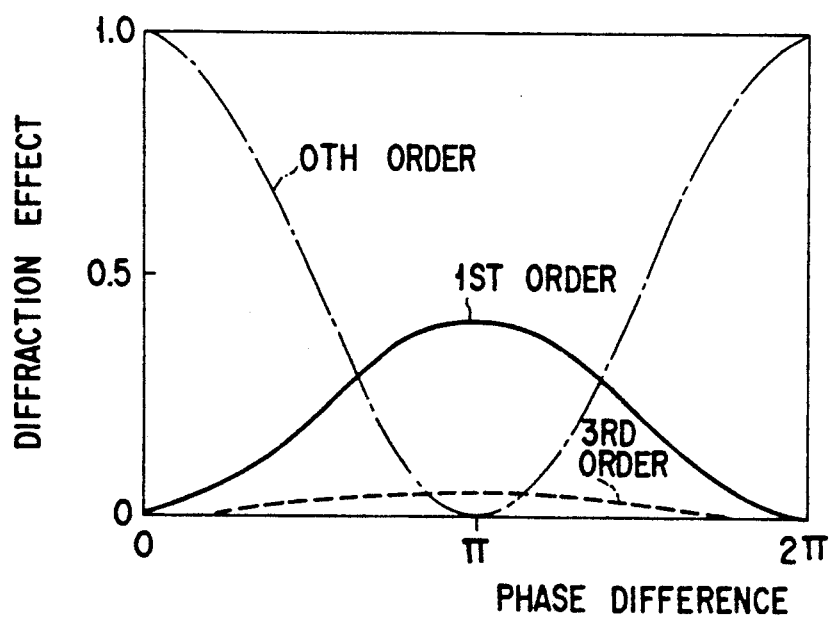
F I G. 28

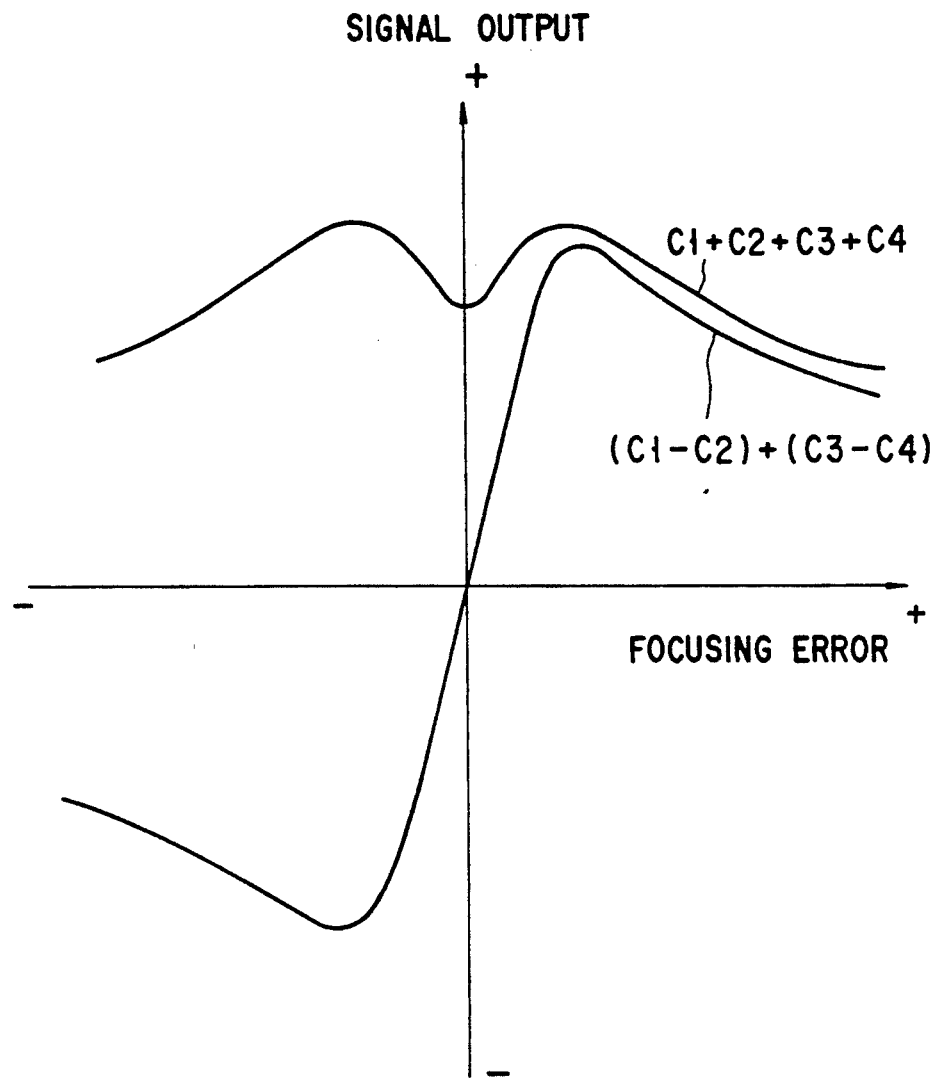
F I G. 30

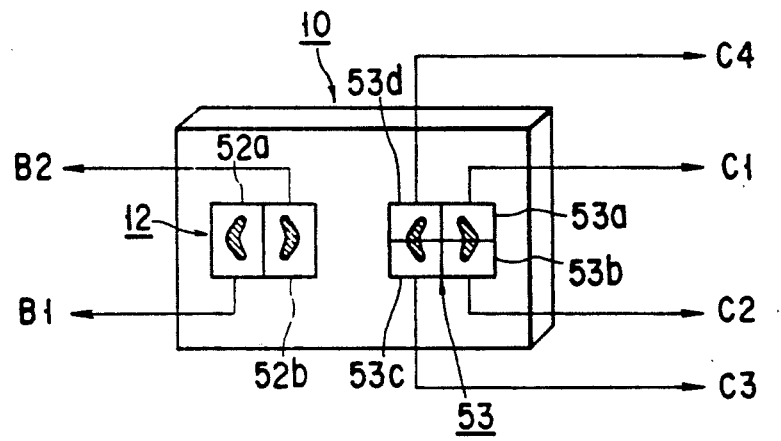
F I G. 31
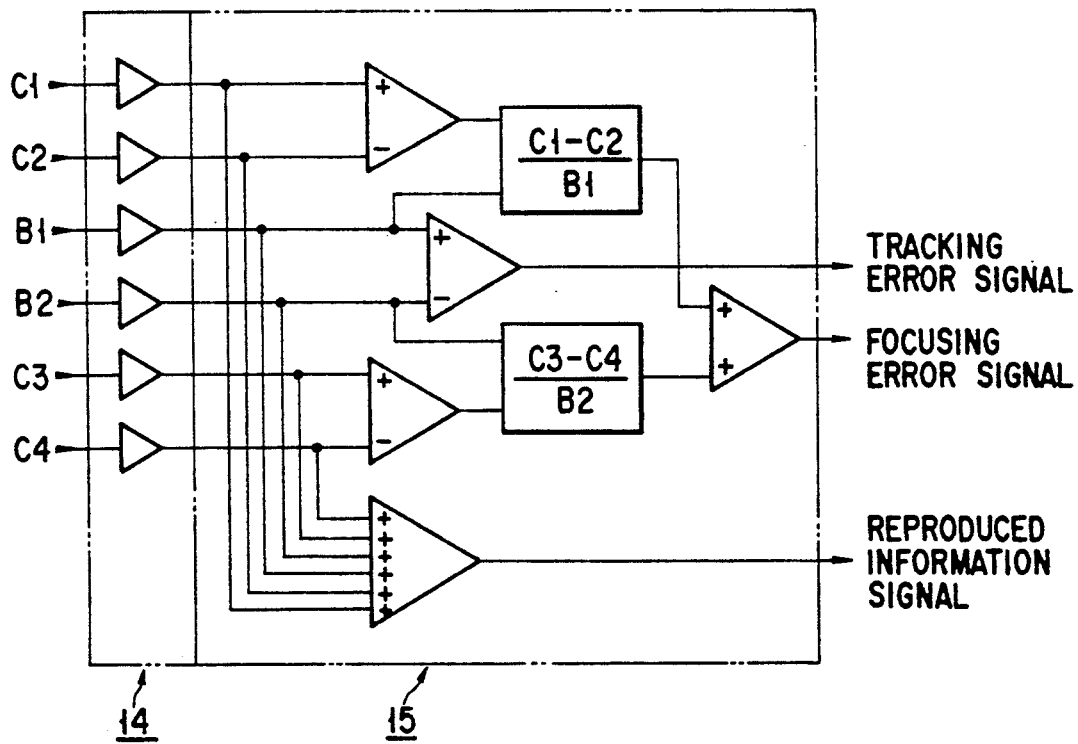
F I G. 32

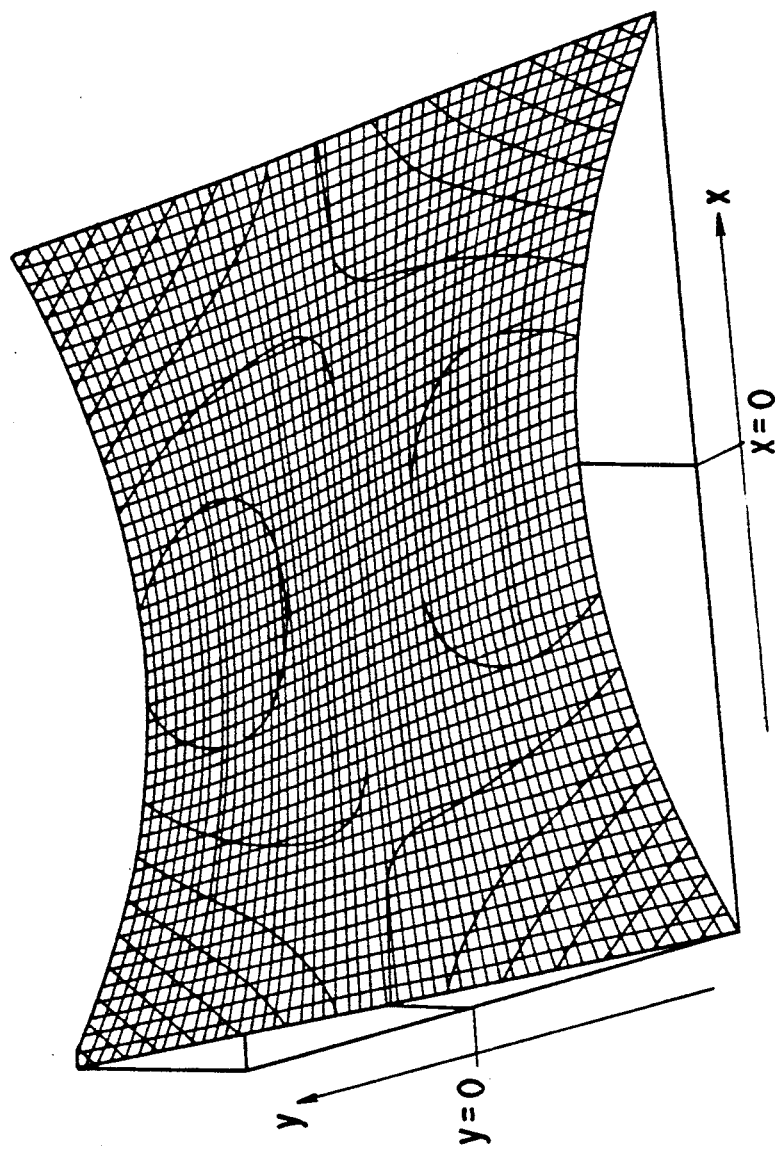
F I G. 33

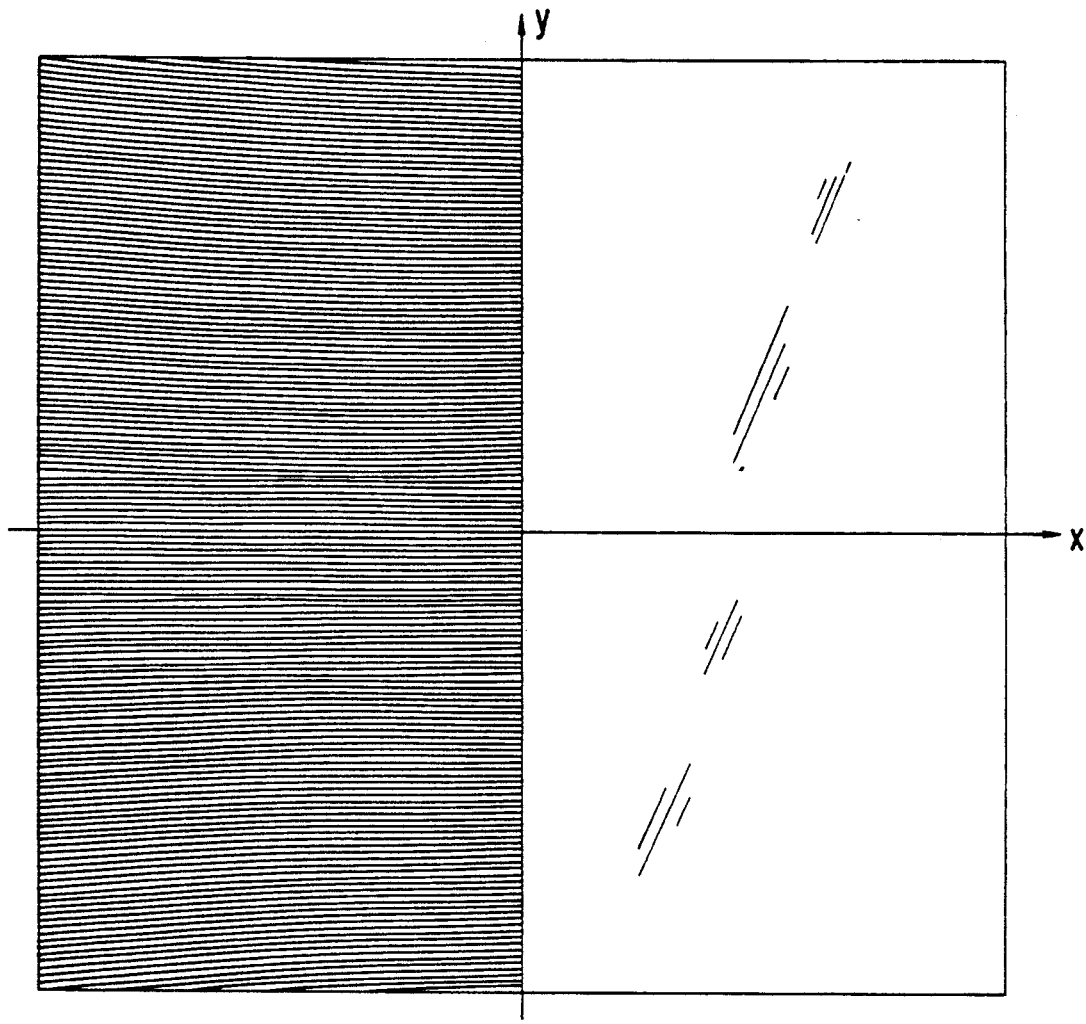
F I G. 34

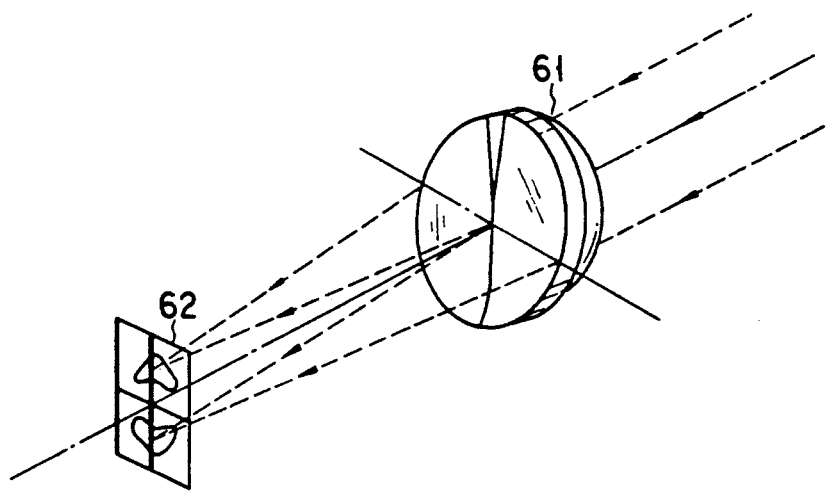
F I G. 37
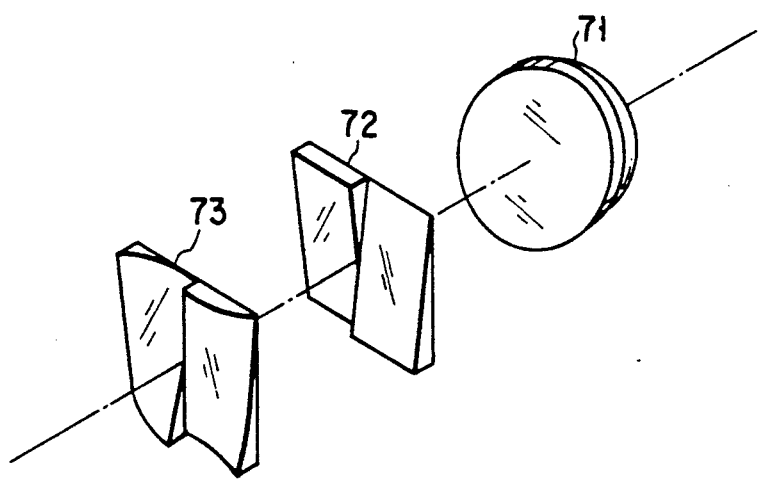
F I G. 38

PRIOR ART
FIG. 41A
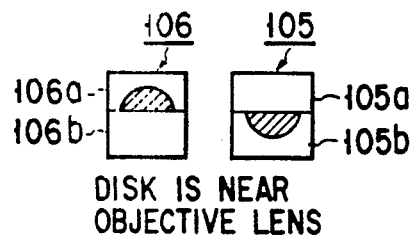
DISK IS NEAR OBJECTIVE LENS
PRIOR ART
FIG. 41B
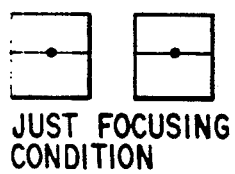
JUST FOCUSING CONDITION
PRIOR ART
FIG. 41C
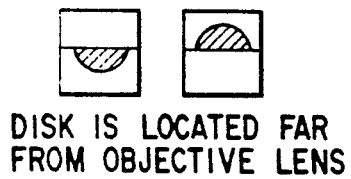
DISK IS LOCATED FAR FROM OBJECTIVE LENS
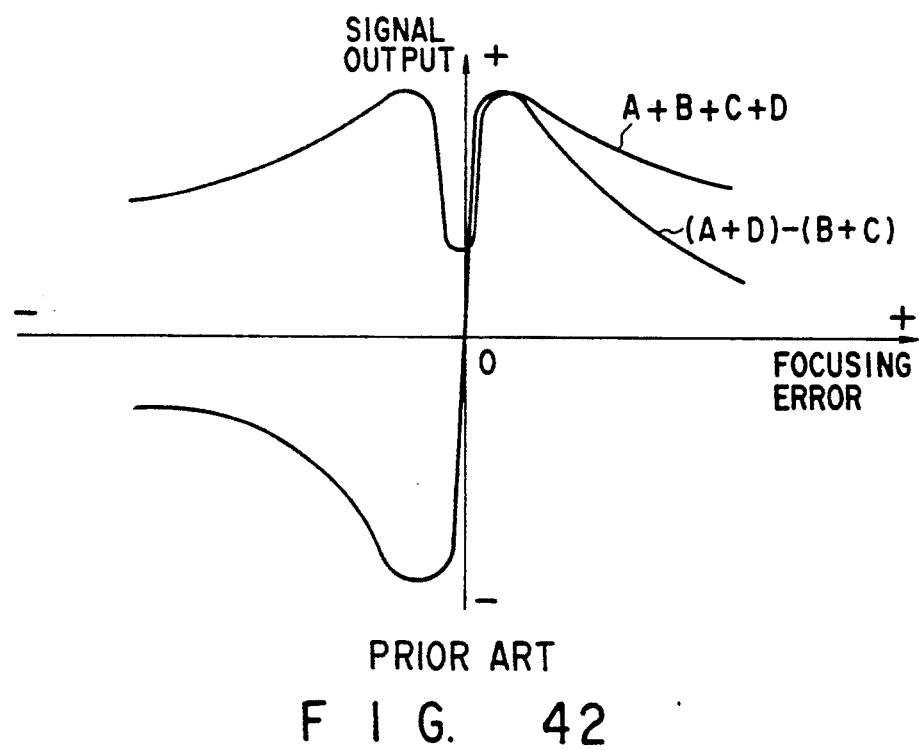
PRIOR ART
FIG. 42

OPTICAL HEAD INCLUDING FOCUSING ERROR DETECTING SYSTEM

BACKGROUND OF THE INVENTION

1. Field of the Invention

The present invention relates to an optical head for performing at least recording or reproduction of information on or from, e.g., an optical disk or an optical memory by radiating a light beam thereon and, more particularly, to an apparatus for detecting a focusing error of an objective lens with respect to the recording surface of an optical memory.

2. Description of the Related Art

An optical head is used for an optical disk apparatus for recording/reproducing information using, e.g., an optical disk. In this optical head, in order to focus and radiate light from a light source onto a predetermined recording surface of an optical disk, it is important to cause the focal position of an objective lens to coincide with the recording surface. For this purpose, the focusing error of the objective lens relative to the recording surface is detected, and the objective lens is moved in the direction of the optical axis on the basis of the focusing error (i.e., focusing servo control).

A large number of methods of detecting a focusing error in an optical head have already been known. The method of the present invention is most similar to a method of double-knife-edge. FIG. 40 shows the arrangement of an optical system in a focusing error detecting apparatus employing the method of double-knife-edge.

Referring to FIG. 40, light reflected by an optical disk (not shown) passes through an objective lens (not shown) in the opposite direction to light incident on the optical disk, and is subsequently separated from the incident light by a beam splitter 101. Thereafter, the separated light is split into two light beams by wedge prisms 102 and 103 (cf. or two-split prisms). The two light beams are then focused by a converging lens 104 onto the detection surfaces of two-split photodetectors 105 and 106 arranged at different positions.

FIGS. 41A to 41C are projected views showing changes in spot shape of light beams on detection surfaces 105a, 105b, 106a, and 106b of the two-split photodetectors 105 and 106. FIG. 42 is a graph showing curves indicating changes in focusing error signal and in reproduced information signal with respect to focusing errors. If output signals from the detection surfaces 105a, 105b, 106a, and 106b of the two-split photodetectors 105 and 106 are respectively represented by A, B, C, and D, a focusing error signal obtained by a processing circuit can be represented by $(A+D)-(B+C)$; and a reproduced information signal, $(A+B+C+D)$. As is understood from the curves in FIG. 42, in the method of double-knife-edge, changes in level of a focusing error signal near the in-focus point are large, thus ensuring high detection sensitivity of focusing errors.

In this conventional focusing error detecting apparatus, however, as shown in FIG. 41B, since very small light beam spots are formed on the detection surfaces of the photodetectors 105 and 106 in the just focusing condition, the widths of non-detecting regions on the detection surface splitting lines of the photodetectors 105 and 106 are significantly large in relation to the sizes of the beam spots. The amounts of light incident on the photodetectors 105 and 106 and a focusing error detection range in the just focusing condition are substantially determined by the widths of non-detecting regions. Therefore, the degree of freedom in setting such amounts of light and detection range is greatly decreased.

As described above, in the conventional focusing error detecting apparatus based on the method of double-knife-edge, since the amounts of light incident on the photodetectors and the focusing error detection range in the just focusing condition are greatly influenced by the widths of the non-detecting regions of the photodetectors, the degree of freedom in setting them is low. Therefore, the degree of freedom in setting in design and applications is undesirably decreased.

SUMMARY OF THE INVENTION

It is an object of the present invention to provide an optical head which allows a large amount of light to become incident on a photodetector in the just focusing condition and ensures a high degree of freedom in setting of a focusing error detection range.

In order to achieve the above object, according to the present invention, an optical head has the following arrangement. A converging lens and a holographic optical element (HOE) are arranged in the optical path of light which is reflected by a recording surface and passes through an objective lens. The holographic optical element is designed to form a hologram in at least one of two regions split along a region splitting line crossing the optical axis of the converging lens. In addition, a photodetector having first and second split detection surfaces for detecting light diffracted by the holograms. As these split surfaces, two-split detection surfaces are basically used. With this arrangement, a focusing error, of the objective lens, relative to the recording surface of an optical memory can be obtained by performing an arithmetic operation of output signals from the photodetector.

According to the characteristics of the holographic optical element, when the objective lens is in a just focusing condition with respect to the recording surface of the optical memory, the spot shape of each reflected beam projected on a corresponding one of the detection surfaces of the photodetector is symmetrical about the detector partition line but when the objective lens deviates from the just focusing condition, the spot shape deviates from the line symmetry in accordance with the defocusing amount. The holographic optical element having such characteristics corresponds to, e.g., an aeolotropic, aspherical lens whose focusing power changes continuously along the region splitting line. This holographic optical element is designed to provide a proper phase change for a light beam in accordance with the position of the element.

The holographic optical element may be constituted by an element having first and second holograms in two regions split along the region splitting line crossing the optical axis of the converging lens. The first and second holograms have a phase transfer function for providing aberrations which are symmetrical about, e.g., the region splitting line, and are arranged such that the same diffraction angle is set and diffraction azimuths are symmetrical about the region splitting line. In this arrangement, the first and second split detection surfaces of the photodetector serve to detect ±1st order diffracted beams generated by the holographic optical element.

In addition, the first and second holograms may be arranged to have a phase transfer function for providing aberrations which are substantially point-symmetrical with the optical axis as an origin and have different diffraction angles. In this case, the first and second split detection surfaces serve to detect diffracted beams of the same order (e.g., +1st order diffracted beams generated by the first and second holograms).

In other words, the holographic optical element is designed such that the aberration components of the phase transfer function serve as a function asymmetrical about an axis perpendicular to the main diffraction direction. More specifically, the holographic optical element is designed to deflect the diffraction direction of a light beam, which passes through one of the sides split by an axis perpendicular to the main direction, toward one side with respect to the main diffraction direction, and deflect the diffraction direction of a light beam, which passes through the other side, toward the opposite side with respect to the main diffraction direction.

In the present invention, in place of the above-described holographic optical element, a multi-functional optical element for obtaining two light beams may be used. This multi-functional optical element is an element for receiving light, reflected by an optical memory, as incident light, and has a focusing function and a light beam separating function. In addition, the multi-functional optical element has a mixed aberration generating function with the following characteristics. When the objective lens is in a just focusing condition with respect to a recording surface, the spot shape of each reflected light beam projected on a corresponding one of the split detection surfaces of the photodetector is symmetrical about the partition line of the split detection surface. When the objective lens deviates from the just focusing condition, the spot shape deviates from the line symmetry in accordance with the defocusing amount.

A light beam reflected by the recording surface of the optical memory passes through the objective lens. The light beam is then radiated on the holographic optical element through the converging lens to be diffracted and incident on the photodetector. With the effect of the holographic optical element, the spot shape of each reflected light beam projected on a corresponding one of the detection surfaces of the photodetector exhibits symmetry about the detector partition line when the objective lens is in a just focusing condition, whereas when the objective lens deviates from the just focusing condition, the spot shape changes continuously in accordance with the defocusing amount (focusing error amount).

By using the above-described holographic optical element as an optical element for detecting a focusing error, a spot shape which is symmetrical about the partition line of each detection surface can be obtained in a just focusing condition while wavefront aberrations, produced when a light beam passes through the holographic optical element, are increased to further increase the size of each light beam spot on a corresponding one of the detection surfaces of the photodetector in the just focusing condition. Therefore, since the amount of light received by the photodetector is relatively large even in a just focusing condition, a stable focusing error detecting operation can be performed without being influenced by the non-detecting region present at the boundary between the split detection surfaces of the photodetector.

In addition, by properly adjusting the grating configuration of the hologram of the holographic optical element, the state of change in shape of each light beam spot due to a focusing error is changed. This increases the degree of freedom of focusing error detection characteristics. Therefore, the optical head can be easily set to desired characteristics.

Furthermore, by using the holographic optical element to detect a focusing error, the optical system can be reduced in size as compared with the conventional focusing error detecting apparatus using a double-wedge prism.

On the other hand, when the +1st order diffracted beams obtained by the holographic optical element are respectively detected by the first and second two-split detection surfaces, and subtraction is performed on output signals respectively corresponding to these two-split detection surfaces, the offset of a focusing error detection output, caused by changes in wavelength of a light beam incident on the holographic optical element, can be canceled.

In addition, according to the arrangement in which at least a +1st order diffracted beam from one halogram of the holographic optical element and a −1st order diffracted beam from the other hologram are respectively detected by the first and second two-split detection surfaces, the difference between detection outputs from the two-split detection surfaces is calculated, and these output signals are subsequently added together to obtain a focusing error signal, the offset of a focusing error signal output, caused by changes in position and wavelength of a light beam incident on the holographic optical element due to movement of the objective lens upon tracking or tilting of the optical disk, is canceled.

Moreover, according to the arrangement in which diffracted beams of the same order, e.g., +1st order diffracted beams, obtained by the two holograms of the holographic optical element, are respectively detected by the first and second two-split detection surfaces, the difference between detection outputs from the two-split detection surfaces is calculated, and the output signals are subsequently added together to obtain a focusing error signal, similar to the above-described arrangement, the offset of a focusing error detection output, caused by changes in position and wavelength of a light beam incident on the holographic optical element, can be canceled.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 13A to 13C are projected views showing changes in shape of a light beam spot on each detection surface in FIG. 11 with respect to focusing errors;

FIG. 15 is a view showing another arrangement of the detection surfaces of the photodetector to be used in combination with the holographic optical element in FIG. 9;

FIG. 16 is a block diagram showing an electronic circuit system for processing output signals from the photodetector in FIG. 15;

FIG. 17 is a plan view showing another arrangement of the holographic optical element according to the present invention;

FIG. 18 is a perspective view showing the aberration components of the phase transfer function of the holographic optical element in FIG. 17;

FIG. 20 is a view showing the arrangement of the detection surfaces of a photodetector to be used in combination with the holographic optical element in FIG. 17;

FIG. 21 is a block diagram showing an electronic circuit system for processing output signals from the photodetector in FIG. 20;

FIGS. 22A to 22C are projected views showing changes in shape of a light beam spot on each detection surface in FIG. 20;

FIG. 27 is a block diagram showing an electronic circuit system for processing output signals from the photodetector in FIG. 26;

FIG. 28 is a graph showing the relationship between the optical phase difference dependent on the sectional shape of the holographic optical element in FIG. 24 and the diffraction efficiency;

FIG. 30 is a graph showing changes in a focusing error signal and a sum, obtained by a processing circuit in FIG. 27;

FIG. 31 is a view showing the arrangement of the detection surfaces of a photodetector to be used in combination with the holographic optical element in FIG. 24;

FIG. 32 is a block diagram showing an electronic circuit system for processing output signals from the photodetector in FIG. 31;

FIG. 33 is a perspective view showing the aberration components of the phase transfer function of the holographic optical element according to the present invention;

FIG. 34 is a plan view illustrating the grating pattern of an actual holographic optical element according to the present invention;

FIG. 37 is a perspective view showing a main part of an optical system according to another embodiment of the present invention;

FIG. 38 is a perspective view showing the arrangement of a multi-functional optical element in FIG. 37;

FIGS. 41A to 41C are projected views showing changes in shape of light beam spots on a two-split photodetector with respect to focusing errors in the conventional focusing error detecting apparatus in FIG. 40; and FIG. 42 is a graph showing changes in a focusing error signal and a reproduced information signal as a function of the focusing error in the conventional focusing error detecting apparatus in FIG. 40.

DETAILED DESCRIPTION OF THE PREFERRED EMBODIMENTS

First Embodiment

Figure 1:
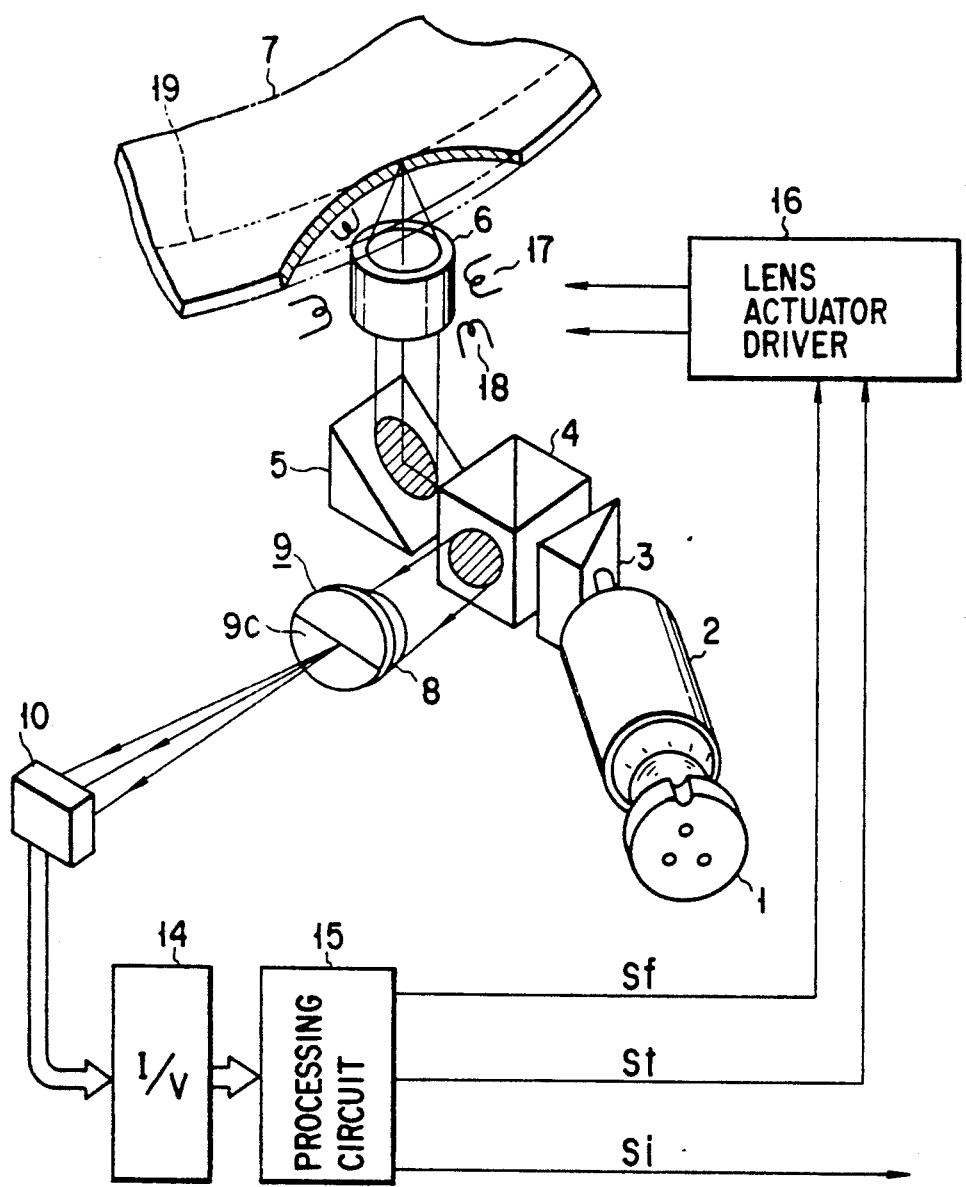
FIG. 1 is a view showing a main part of an optical head according to an embodiment of the present invention.

FIG. 1 shows the arrangement of an optical head according to an embodiment of the present invention. This optical head comprises a light source 1, a collimating lens 2, a beam shaping prism 3, a beam splitter 4, a mirror 5, an objective lens 6, an optical disk 7, a converging lens 8, a holographic optical element 9, a photodetector 10, an amplifier 14 having a current/voltage conversion function, a processing circuit 15, a lens actuator driver 16, a focus drive coil 17, and a radial drive coil 18.

The light source 1 is a laser source such as a semiconductor laser. Light emitted from the light source 1 is converted into a parallel light beam by the collimating lens 2. The light beam emerging from the collimating lens 2 is properly shaped by the subsequent beam shaping prism 3 and is incident on the beam splitter 4. The light transmitted through the beam splitter 4 is guided to the objective lens 6 by the mirror 5. The light is then focused and radiated, as a small beam spot, on the recording surface of the optical disk 7 by the objective lens 6.

Light reflected by the recording surface of the optical disk 7 passes through the objective lens 6 and the mirror 5 in the opposite direction to the light incident on the optical disk 7 and is subsequently incident on the beam splitter 4. Part of the light reflected by the optical disk 7 and radiated on the beam splitter 4 is reflected by the beam splitter 4 to be incident on the holographic optical element 9 through the converging lens 8.

As shown in, e.g., FIG. 2, the holographic optical element 9 is constituted by a hologram region 9A constituting a diffraction grating, and a region 9B where no hologram is formed (to be referred to as a light-transmitting region hereinafter). These two regions 9A and 9B are separated from each other by a straight line passing through the optical axis of the converging lens 8 and parallel to a groove 19 in the optical disk 7, i.e., a region splitting line 9C. In the arrangement shown in FIG. 2, the hologram region 9A and the light-transmitting region 9B are respectively formed on the upper and lower halves of the holographic optical element 9. The light-transmitting region 9B has the function of transmitting an incident light beam (directly). As will be described later, the holographic optical element 9 has a wavefront conversion function, i.e., the function of changing the spot shape of a light beam incident on the photodetector 10 in accordance with the shift of the objective lens 6 relative to the optical disk 7, i.e., the defocusing amount from the focal position.

Figure 3:
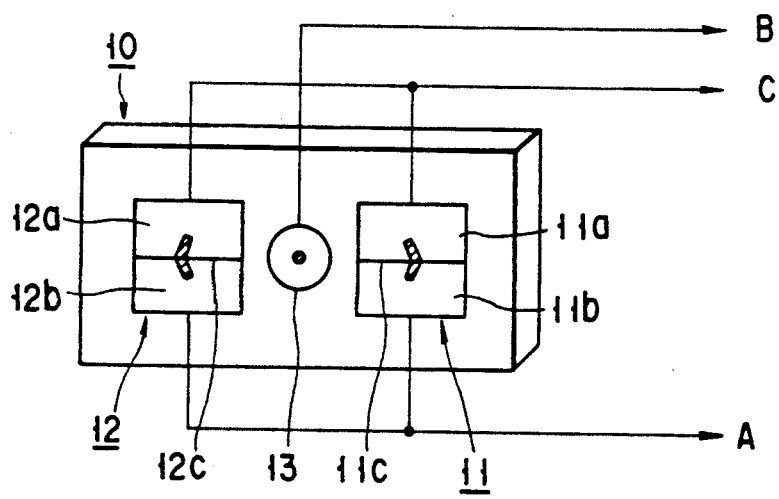
FIG. 3 is a view showing an arrangement of the detection surfaces of a photodetector to be used in combination with the holographic optical element in FIG. 2.

The photodetector 10 shown in FIG. 3 is arranged at a predetermined position in the apparatus so as to detect light emerging from the holographic optical element 9. The photodetector 10 includes first and second two-split detection surfaces 11 and 12, and a non-split detection surface 13 located therebetween. The two-split detection surfaces 11 and 12 are arranged to respectively detect ±1st order diffracted beams (i.e., a +1st order diffracted beam and a −1st order diffracted beam) of light diffracted by the hologram region 9A of the holographic optical element 9. In addition, the surfaces 11 and 12 are respectively split into regions 11a and 11b, and regions 12a and 12b by partition lines 11c and 12c which substantially coincide with the region splitting line 9C of the holographic optical element 9.

The non-split detection surface 13 is arranged to detect light transmitted through the light-transmitting region 9B of the holographic optical element 9.

Output signals from the two-split detection surfaces 11 and 12 are current/voltage-converted and amplified to a proper level by the amplifier 14. The signals are then input to the processing circuit 15. Providing that a composite signal consisting of output signals corresponding to the lower half regions 11b and 12b of the two-split detection surfaces 11 and 12 is represented by A; a composite signal consisting of output signals corresponding to the upper half regions 11a and 12a, C; and an output signal corresponding to the non-split detection surface 13, B, the processing circuit 15 generates a focusing error signal Sf by performing an arithmetic operation of (A−C). Similarly, the processing circuit 15 generates a reproduced information signal Si by an arithmetic operation of (A+B+C). Furthermore, the processing circuit 15 generates a tracking error signal St, caused by the groove 19 in the optical disk 7, by performing an arithmetic operation of ((A+C)−B).

The focusing error signal Sf and the tracking error signal St are respectively supplied to the focus drive coil 17 and the radial drive coil 18 through the lens actuator driver 16 so as to control currents supplied to the coils 17 and 18. With this control, the objective lens 6 is controlled in the focus direction (i.e., the direction of the optical axis of the objective lens 6) and the radial direction (i.e., the radial direction of the optical disk 7), thus performing positional control of a light beam spot with respect to the optical disk 7.

The configuration of the hologram region 9A of the holographic optical element 9 will be described next.

Figure 2:
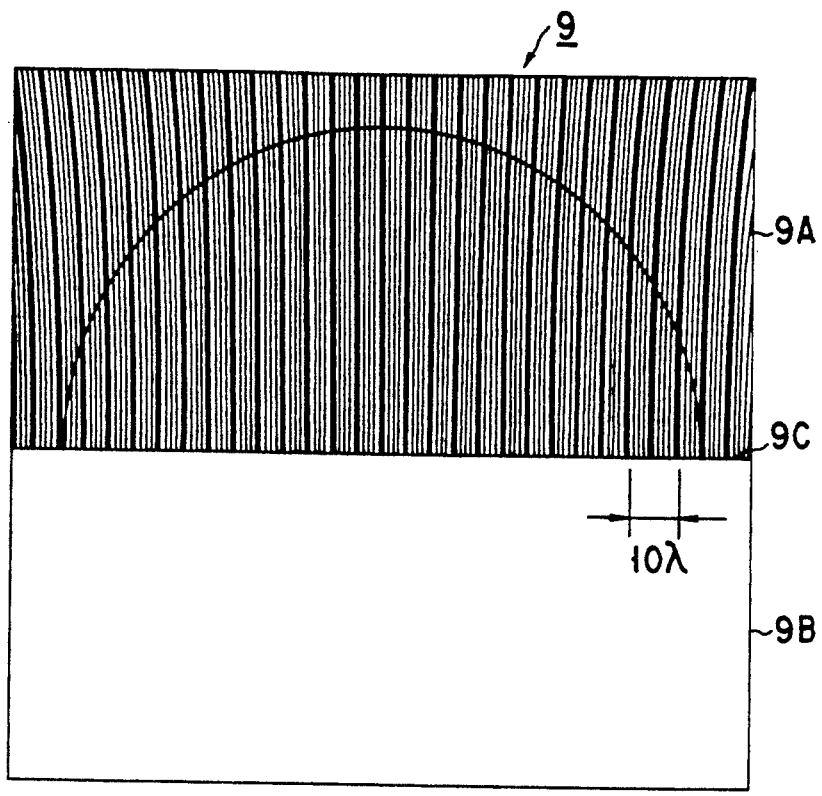
FIG. 2 is a plan view showing an arrangement of a holographic optical element according to the present invention.

As shown in FIG. 2, the grating pitch of the hologram region 9A has a spatial frequency required to separately detect diffracted light from the hologram region 9A of the holographic optical element 9 and transmitted light from the light-transmitting region 9B at the focal plane of the converging lens 8. In addition, the grating pitch is spatially changed to transform the shape of the diffracted light into a spot shape required to detect a focusing error at the focal plane of the converging lens 8.

This grating configuration is an example designed to separate an undiffracted beam from a 1st order diffracted beam by about 0.6 mm on the surface of the photodetector 10, provided that the diameter of the aperture of the converging lens 8, indicated by a semicircle in FIG. 2, is 4.4 mm, and the focal length of the converging lens 8 is 24 mm. The average grating pitch is 32 fm. Referring to FIG. 2, grating elements are drawn with thick lines every five pitches to allow an easy understanding of the grating configuration.

Figure 4:
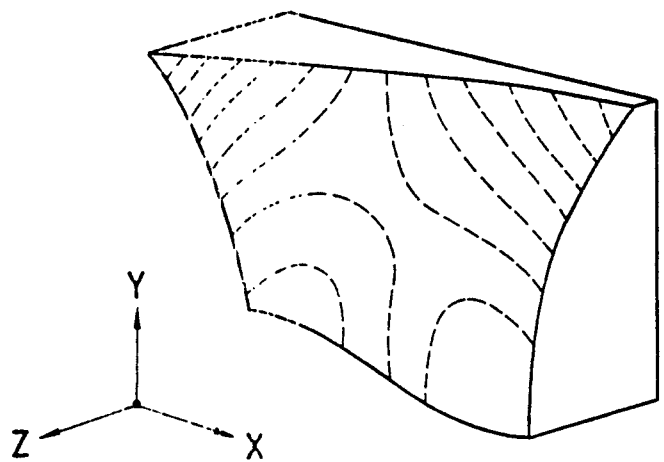
FIG. 4 is a perspective view showing the aberration components of the phase transfer function of the holographic optical element to explain the function of a hologram region in FIG. 3.

The wavefront conversion function of the holographic optical element 9 will be described in detail below with reference to FIG. 4. In FIG. 4, broken lines indicate moiré fringes generated when a grating having a spatial frequency which is provided for the hologram to separate an undiffracted beam from a 1st order diffracted beam is made to overlap the hologram region 9A shown in FIG. 2. In this case, the moiré fringes are three-dimensionally expressed as λ/2-pitch equiphase lines (contour lines). That is, FIG. 4 shows a spatial phase change amount provided for a so-called +1st order diffracted beam. This stereoscopic shape corresponds to the shape of an optical element obtained when a function equivalent to that of the holographic optical element 9 is realized by a glass block or the like. As is apparent from the drawing, the stereoscopic shape is very complicated.

The sectional shape of the holographic optical element 9 will be described next. In order to separate a 1st order diffracted beam into two equal ±1st order diffracted beams while the amount of light transmitted through the hologram region 9A without undergoing diffraction is set to be substantially zero, the sectional shape of the hologram region 9A constitutes a stepped phase grating which is designed such that light undergoes an optical phase difference c upon passing through the grating when the ratio (to be referred to as a duty hereinafter) of the grating width to the grating pitch is ½ (i.e., 50%).

Figure 5:
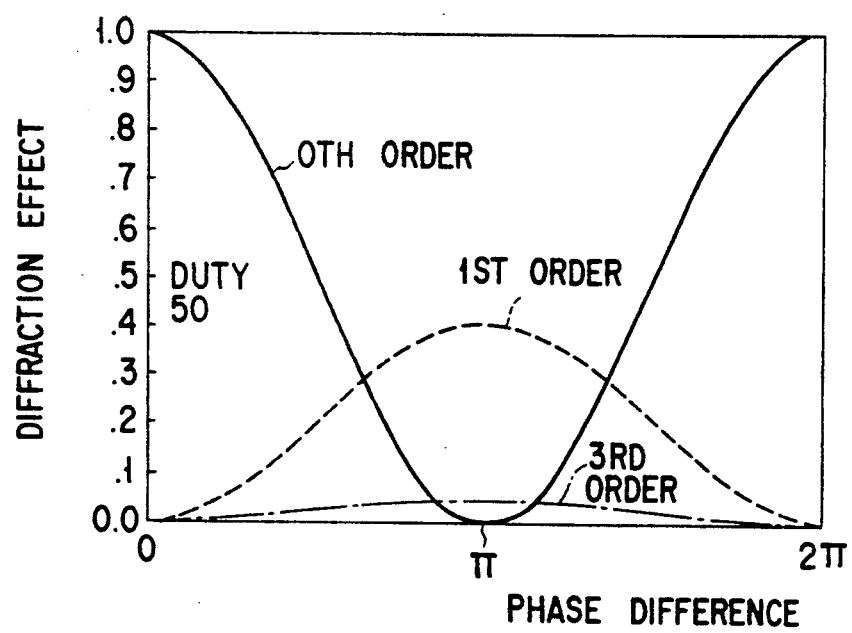
FIG. 5 is a graph showing the relationship between the optical phase difference dependent on the sectional shape of the holographic optical element in FIG. 2 and the diffraction efficiency.

Referring to a graph in FIG. 5, the axis of ordinate indicates the diffraction efficiency for each order of diffraction as a function of the optical phase difference which light undergoes when it passes through the grating, provided that the duty of the hologram region 9A is set to be ½. Since the duty is ½, the diffraction efficiency for diffraction of an even order is zero. As is apparent from FIG. 5, it is expected that the sectional shape of a hologram which allows the maximum amount of a 1st order diffracted beam while the amount of light which is transmitted through the hologram region 9A without undergoing diffraction is set to be substantially zero corresponds to a stepped phase grating which is designed such that light undergoes the optical phase difference c when it passes through the grating.

Figure 6:
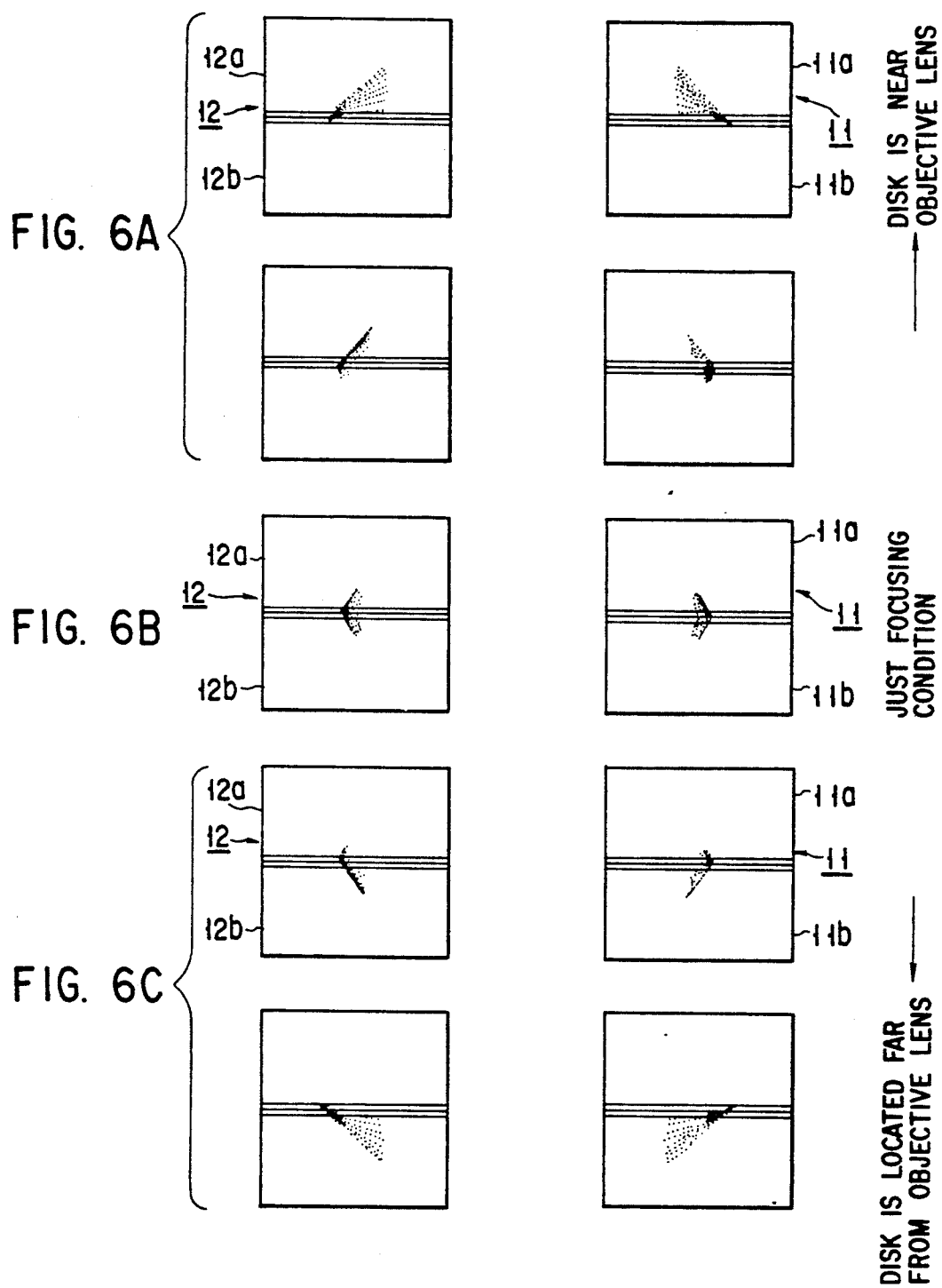
FIGS. 6A to 6C are projected views showing changes in shape of a light beam spot with respect to focusing errors on the detection surfaces in FIG. 3.

FIGS. 6A to 6C show sequential changes in shape of each light beam spot on a corresponding one of the detection surfaces of the photodetector 10 when a light beam is radiated on the holographic optical element 9 having the above-described hologram configuration while the relative position between the objective lens 6 and the optical disk 7 is kept changed. Referring to FIGS. 6A to 6C, a light beam spot is expressed as a collection of dots, and the density of dots corresponds to the light intensity.

FIG. 6B shows the shapes of light beam spots in a just focusing condition. The shape of the light beam spot on each of the two-split detection surfaces 11 and 12 is symmetrical about the partition line (line-symmetrical). Such (line-symmetrical) shapes can be easily expected from the stereoscopic figure in FIG. 4 showing aberration components of a phase transfer function, which is referred to in order to explain the wavefront conversion function of the holographic optical element 9.

A focusing effect on a light beam on a line perpendicular to the region splitting line 9C of the holographic optical element 9 will be considered here. At a position near the center of a light beam, a convergent light beam conforming to the convergent effect of the converging lens 8 is formed, because no focusing effect is present. However, at a position separated from the center of the light beam, the holographic optical element 9 exhibits a lens effect such as a convergent or divergent effect. Such a lens effect is enhanced with an increase in distance from the center of the light beam. With the above-described focusing effect, light beams located before and after an in-focus state are formed on the same plane at the focal position of the converging lens 8. Therefore, the respective beam spots have the shapes shown in FIG. 6B. In order to improve their symmetry, a certain degree of a lens effect is preferably produced along the region splitting line 9C.

FIG. 6A shows the states of light beam spots in a case wherein the objective lens 6 is at a position near the optical disk 7. More specifically, as the light beam spots on the lower half regions 11b and 12b of the two-split detection surfaces 11 and 12 are gradually moved to the upper half regions 11a and 12a, the light beam spots on the regions 11a and 12a are gradually increased in size. In contrast to this, FIG. 6C shows the states of light beam spots in a case wherein the objective lens 67 is set apart from the optical disk 7. In this case, therefore, changes in light beam spot occur conversely with respect to the case shown in FIG. 6A. As described above, providing that a composite signal consisting of output signals corresponding to the regions 11b and 12b is represented by A; and a composite signal consisting of output signals corresponding to the regions 11a and 12a, C, the processing circuit 15 performs an arithmetic operation of (A−C) to obtain a focusing error signal, which is at the zero level in a just focusing condition in FIG. 6B, and whose level and polarity change in accordance with the defocussing amount and the defocusing direction from the focal position of the objective lens 6.

In addition, since light beam spots on the two-split detection surfaces 11 and 12 widely spread in a just focusing condition in FIG. 6B, the amounts of light which is incident on the non-detecting regions on the partition lines 11c and 12c and is not detected are decreased. Furthermore, since the shape of each light beam spot is symmetrical about a corresponding one of the partition lines 11c and 12c, it is not easily influenced by the groove 19 in the optical disk 7.

Figure 7:
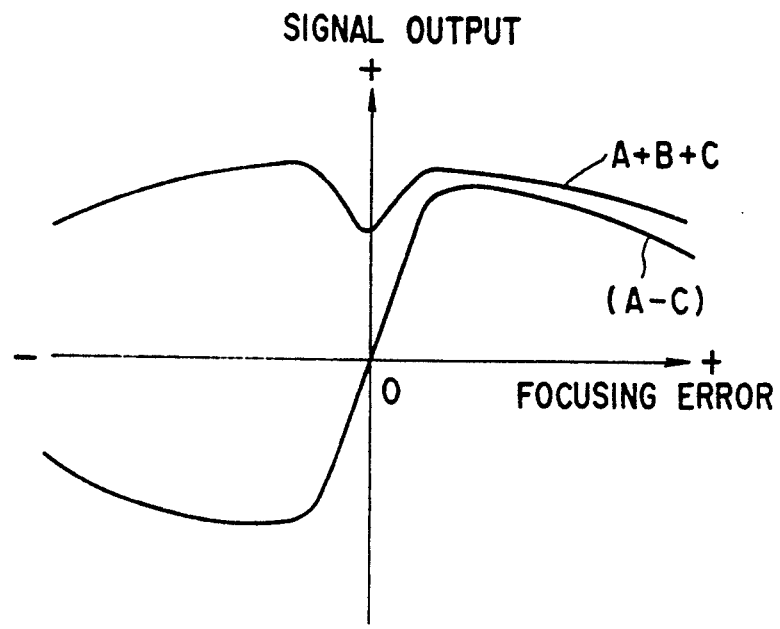
FIG. 7 is a graph showing changes in a focusing error signal and a reproduced information signal, obtained by the photodetector in FIG. 1, as a function of the focusing error.

FIG. 7 is a graph showing curves representing the detection characteristics of a focusing error signal and a reproduced information signal in this embodiment. More specifically, these curves respectively show changes in the focusing error signal SF=(A−C) and in the reproduced information signal Si=(A+B+C) as a function of the focusing error. As is apparent from FIG. 7, the focusing error detection characteristics in a just focusing condition are moderate and the detection range is widened as compared with the conventional method of double-knife-edge. It is also apparent that the amplitude of the reproduced information signal Si is increased as the amounts of light incident on the two-split detection surfaces 11 and 12 are increased in a just focusing condition. Furthermore, according to the embodiment, since the focusing error signal Sf gradually decreases in level after it reaches its maximum value as compared with the conventional astigmatism detection method, even if a defocusing amount from the focal position is large, the objective lens 6 can be easily set at the focal position.

Figure 8A:
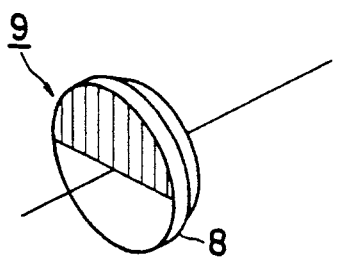
FIGS. 8A to 8C are perspective views showing various combinations of a converging lens and a holographic optical element according to the present invention.
Figure 8B:
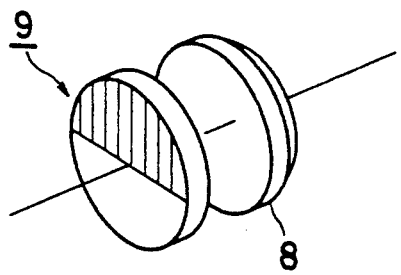
Figure 8C:
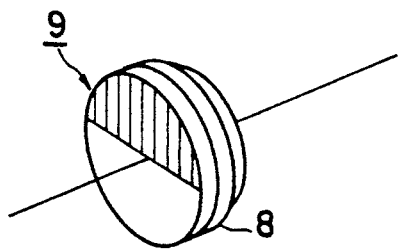

FIGS. 8A to 8C respectively show different combinations of the converging lens 8 and the holographic optical element 9. FIG. 8A shows a case wherein a combination of the converging lens 8 and the holographic optical element 9, similar to the combination shown in FIG. 1, is integrally formed. FIG. 8B shows a case wherein the converging lens 8 and the holographic optical element 9 are separated from each other and independently arranged. FIG. 8C shows a case wherein the converging lens 8 and the holographic optical element 9 are bonded to each other with a transparent adhesive agent to be integrally formed. In each combination, the region splitting line of the holographic optical element 9 is positioned to coincide with the optical axis of the converging lens 8.

According to the embodiment, the two two-split detection surfaces 11 and 12 are formed on the photodetector 10, and the difference between the composite signal A, consisting of output signals corresponding to the lower half regions 11b and 12b, and the composite signal C, consisting of output signals corresponding to the upper half regions 11a and 12a, i.e., (A−C), is used as a focusing error signal. Therefore, the offset of a focusing error signal due to changes in wavelength of the light source 1 can be canceled.

In order to clarify the above-described effect, the influence of changes in wavelength of the light source 1 on the shapes of light beam spots on the detection surfaces of the photodetector 10 will be described below.

As the wavelength of light incident on the holographic optical element 9 changes, its diffraction angle in the hologram region 9A changes. A diffraction angle $\theta$ is represented by the following equation:

$$\theta = \sin^{-1} m\lambda/p \quad (m: \text{order}, \lambda: \text{wavelength}, p: \text{grating pitch})$$

Therefore, when the wavelength changes, the shapes of the light beam spots on the two-split detection surfaces 11 and 12 change in the same manner in the regions 11a and 12b, and the regions 11b and 12a, located at diagonal positions. That is, when the shapes of the light beam spots on the regions 11a and 11b change in the manner shown in FIG. 6A with a change in wavelength, the shapes of the light beam spots on the regions 12a and 12b change in the manner shown in FIG. 6C. That is, when the shapes of light beam spots on the two-split detection surfaces 11 and 12 change with a change in wavelength of the light source 1, the offset of the focusing error signal Sf due to the changes in spots shapes is canceled, provided that the signal (A−C) is equivalent to the focusing error signal Sf.

Note that if the wavelength of the light source 1 is sufficiently constant, the focusing error signal Sf may be generated by calculating only the difference between output signals corresponding to the regions 11a and 11b or the regions 12a and 12b, with one of the two-split detection surface 11 and 12 being omitted. In this case, the focusing error signal Sf can be more effectively generated by blazing the cross-section of the hologram region to constitute a so-called blazed hologram configuration so as to increase the diffraction efficiency in a direction (the order of a positive or negative diffracted beam) in which output signals are used to generate the focusing error signal Sf.

According to the present invention, various modifications of the holographic optical element 9 shown in FIG. 1 can be made. With such modifications, various modifications of the photodetector 10 and the processing circuit 15 can be made.

Second Embodiment

Figure 9:
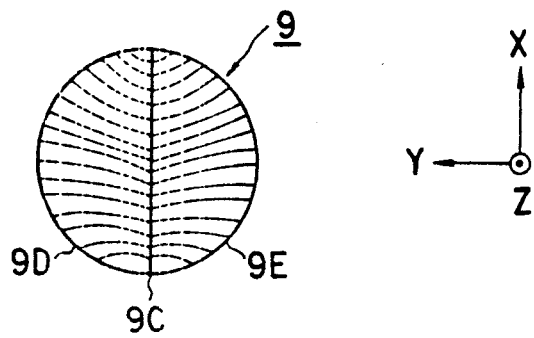
FIG. 9 is a plan view showing another arrangement of the holographic optical element according to the present invention.

A holographic optical element 9 shown in FIG. 9 has two holograms 9D and 9E split by a region splitting line 9C. The grating configuration of each of the holograms 9D and 9E is designed such that grating elements linearly extend at equal intervals near a central portion in a direction parallel to the region splitting line 9C but are distorted in a pincushion-like shape as they extend from the central portion to the peripheral portion. Since the linear portions of the holograms 9D and 9E have different diffraction azimuths, they are integrally formed such that the grating elements of the respective linear portions define predetermined angles. In addition, the grating configurations of the holograms 9D and 9E are symmetrical about the region splitting line 9C.

Figure 10:
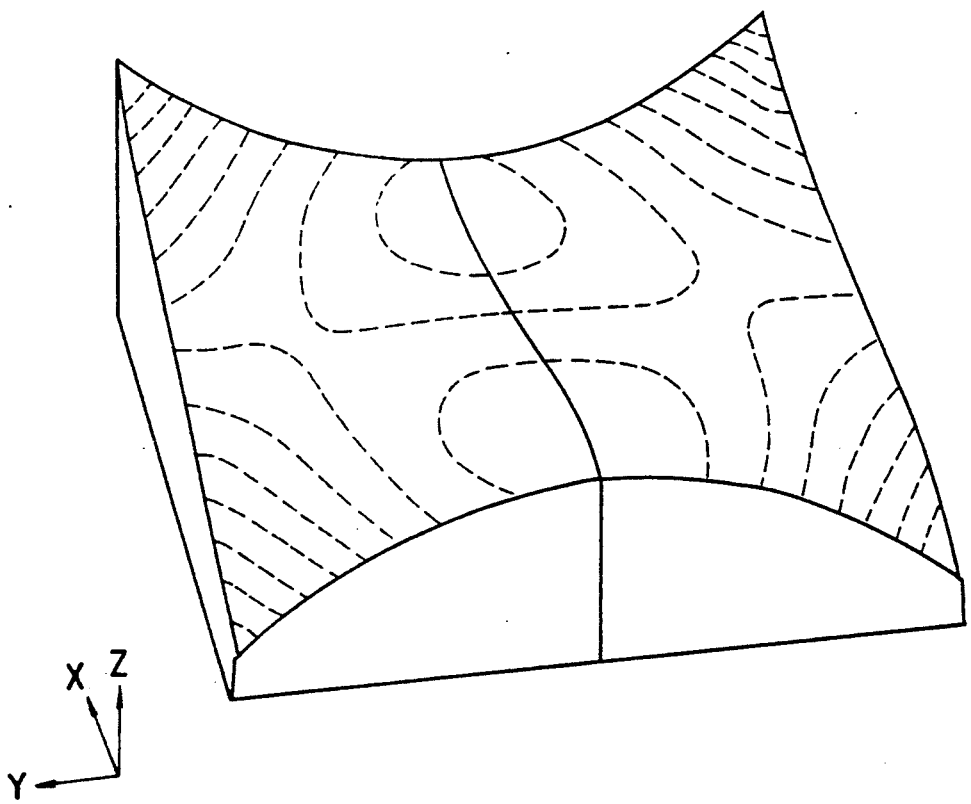
FIG. 10 is a perspective view showing the aberration components of the phase transfer function of the holographic optical element in FIG. 9.

FIG. 10 shows only the aberration components of a phase transfer function, provided for a +1st order diffracted beam by the holographic optical element 9 shown in FIG. 9, with contour lines. The unique shape shown in FIG. 10 corresponds to that of an optical element obtained when the same function as that of the holographic optical element 9 is realized by a glass block or the like. As shown in FIG. 10, the shape is very complicated.

Figure 11:
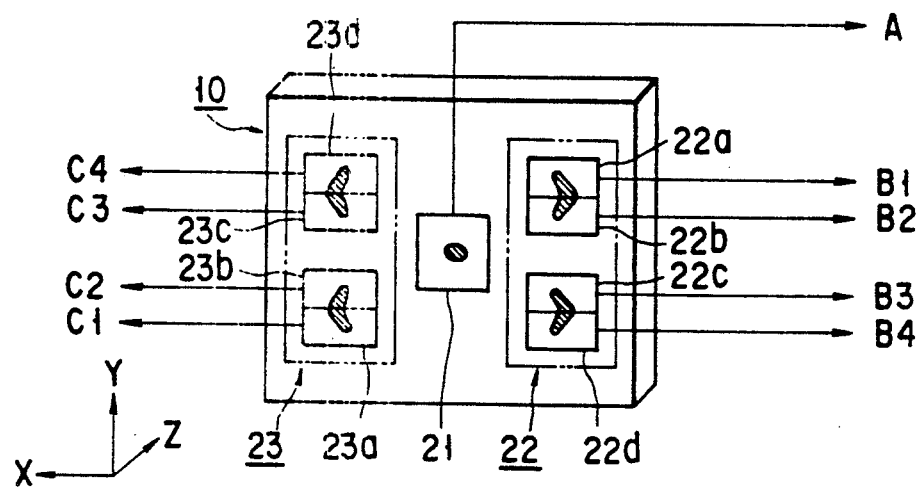
FIG. 11 is a view showing the arrangement of the detection surfaces of a photodetector to be used in combination with the holographic optical element in FIG. 9.

FIG. 11 shows an arrangement of a photodetector 10 used in combination with the holographic optical element 9 shown in FIG. 9. This photodetector 10 includes a detection surface 21 for detecting light which is transmitted through the holographic optical element 9 without undergoing diffraction, and detection surfaces 22 and 23, each having a pair of two-split detection surfaces, arranged on both the sides of the detection surface 21. The two-split detection surface 22 is arranged to detect a +1st order diffracted beam from the holographic optical element 9, whereas the detection surface 23 is arranged to detect a −1st order diffracted beam. The detection surface 22 has a pair of two-split detection surfaces respectively split into regions 22a and 22b, and 22c and 22d by partition lines having the same azimuth as that of the region splitting line 9C of the holographic optical element 9. Similarly, the detection surface 23 has a pair of two-split detection surfaces respectively split into regions 23a and 23b, and 23c and 23d by partition lines having the same azimuth as that of the region splitting line 9C of the holographic optical element 9.

An output signal from the detection surface 21 is represented by A; output signals from the regions 22a, 22b, 22c, and 22d of the detection surface 22, B1, B2, B3, and B4, respectively; and output signals from the regions 23a, 23b, 23c, and 23d of the detection surface 23, C1, C2, C3, and C4, respectively. As shown in the block diagram of FIG. 12, all these signals are input to a processing circuit 15 through an amplifier 14. This processing circuit 15 incorporates dividers to obtain signals by suppressing changes in amount of reflected light, generated when a light beam crosses a groove 19 in an optical disk 7, or changes in gain of a control signal due to changes in amount of light in a recording operation.

The signals D, E, F, and G, a focusing error signal Sf, a tracking error signal St, and a reproduced information signal Si are obtained by the following equations (1):

$$D = (B1 - B2) + (C2 - C1)$$

$$E = (B1 + B2) + (C2 + C1)$$

$$F = (B4 - B3) + (C3 - C4)$$

$$G = (B4 + B3) + (C3 + C4)$$

$$Sf = (D/E) + (F/G)$$

$$St = E - G$$

$$Si = A \tag{1}$$

Figure 12:
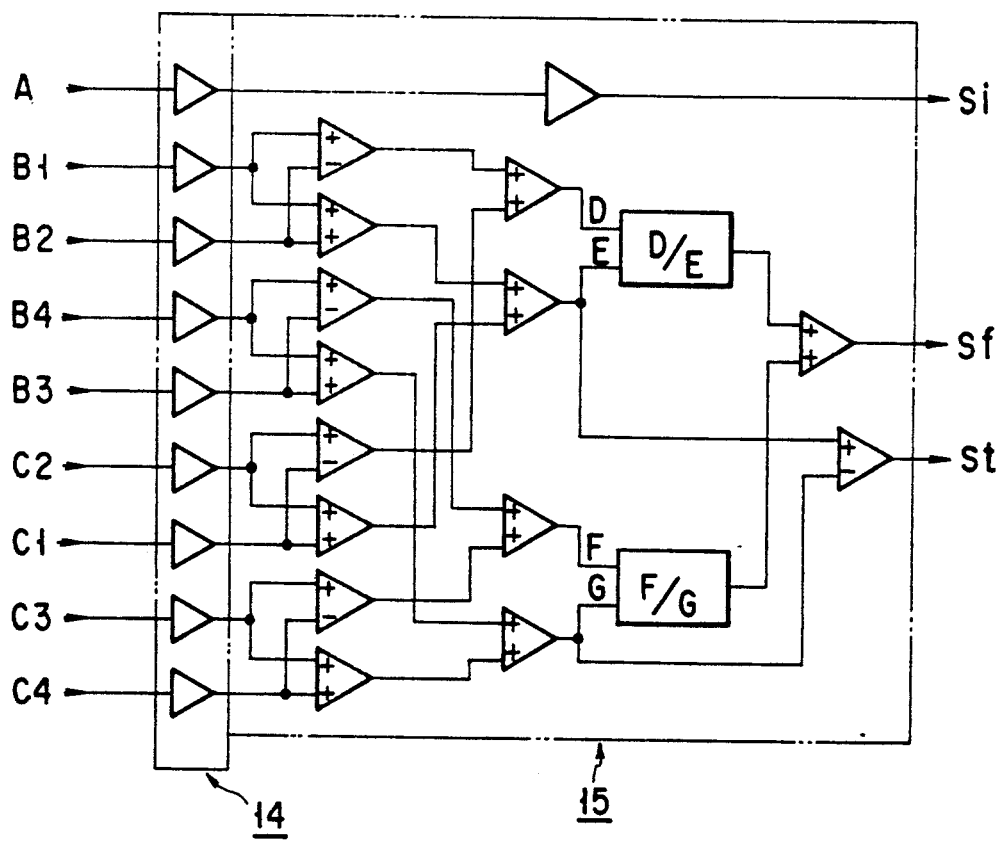
FIG. 12 is a block diagram showing an electronic circuit system for processing output signals from the photodetector in FIG. 11.

Although the dividers in the processing circuit shown in FIG. 12 are used only for the arithmetic operation with respect to the focusing error signal Sf, these dividers may also be used to calculate the tracking error signal St in such a manner that (E−G) is divided by (E+G) to obtain the tracking error signal St. With this operation, changes in gain of a tracking control signal with changes in amount of light in a recording operation can be suppressed.

The sectional shape of the holographic optical element 9 shown in FIG. 9 will be described next. Since the reproduced information signal Si has a wide signal band, the amount of light to be received must be increased. In contrast to this, since the focusing error signal Sf and the tracking error signal St have narrow signal bands, the amounts of light to be received need not be large. In addition, since the reproduced information signal Si is generated by receiving light, which is transmitted through the holographic optical element 9 without undergoing diffraction, through the detection surface 21, it is preferable that the diffraction efficiency of the holographic optical element 9 is not too high. If a grating is formed on the holographic optical element 9 on the basis of an optical phase difference e.g., a phase difference of about $0.3\pi$, about 80% of light incident on the holographic optical element 9 can be received by the detection surface 21. Therefore, since a large amount of light can be received, a signal having a high signal-to-noise (S/N) ratio can be detected.

FIGS. 13A to 13C show changes in shape of light beam spots on the detection surfaces of the photodetector 10 in a case wherein a light beam is radiated on the holographic optical element 9 having the two holograms 9D and 9E shown in FIG. 9 while the relative position between the objective lens 6 and the optical disk 7 is changed. Referring to FIGS. 13A to 13C, each light beam spot is expressed as a collection of dots. The density of dots corresponds to the light intensity. FIG. 13B shows light beam spots in a just focusing condition. Each of the shapes of the light beam spots on the regions 22a and 22b, 22c and 22d, 23a and 23b, and 23c and 23d of the respective two-split detection surfaces is symmetrical about a corresponding one of the partition lines. Such shapes can be easily expected from the illustration in FIG. 10 showing the aberration components of a phase transfer function with contour lines, which is referred to in order to explain the wavefront conversion function of the holographic optical element 9.

A focusing effect on a light beam on a line perpendicular to the region splitting line 9C of the holographic optical element 9 will be considered here. Since the holographic optical element 9 exhibits no focusing effect near the center of the holograms 9D and 9E, a convergent light beam conforming to the convergent effect of the converging lens 8 is formed. However, at a position separated from the center of the light beam, the holographic optical element 9 exhibits a lens effect such as a convergent or divergent effect. Such a lens effect is enhanced with an increase in distance from the center. With the above-described focusing effect, light beams located before and after an in-focus state are formed on the same plane at the focal position of the converging lens 8. Therefore, the respective beam spots have the shapes shown in FIG. 13B. In order to improve their symmetry, a certain degree of a lens effect is preferably provided for the holographic optical element 9 along the region splitting line 9C.

FIG. 13A shows the states of light beam spots in a case wherein the objective lens 6 is located near the optical disk 7. As the light beam spots on the regions 22a and 22d of the detection surface 22 are gradually moved to the regions 22b and 22c, the light beam spots on the regions 22b and 22c are gradually increased in size. Similarly, as the light beam spots on the regions 23b and 23c of the detection surface 23 are gradually moved to the regions 23a and 23d, the light beam spots on the regions 23a and 23d are gradually increased in size. In contrast to FIG. 13A, FIG. 13C shows the states of light beam spots in a case wherein the objective lens 6 is set apart from the optical disk 7. In this case, therefore, changes in light beam spot occur conversely with respect to the case shown in FIG. 13A. As described above, therefore, when the processing circuit 15 performs an arithmetic operation with respect to output signals from the detection surfaces 22 and 23 according to the equations (1), zero is obtained as a solution in the just focusing condition shown in FIG. 13B, thus obtaining a focusing error signal whose level and polarity change in accordance with the defocusing amount and the defocusing direction from the focal position of the objective lens 6. In addition, since light beam spots on the two-split detection surfaces widely spread in a just focusing condition in FIG. 13B, the amounts of light which is incident on the non-detecting regions of the partition lines and is not detected are decreased. Furthermore, since the shape of each light beam spot is symmetrical about a corresponding one of the partition lines, it is not easily influenced by the groove 19 in the optical disk 7.

Figure 14:
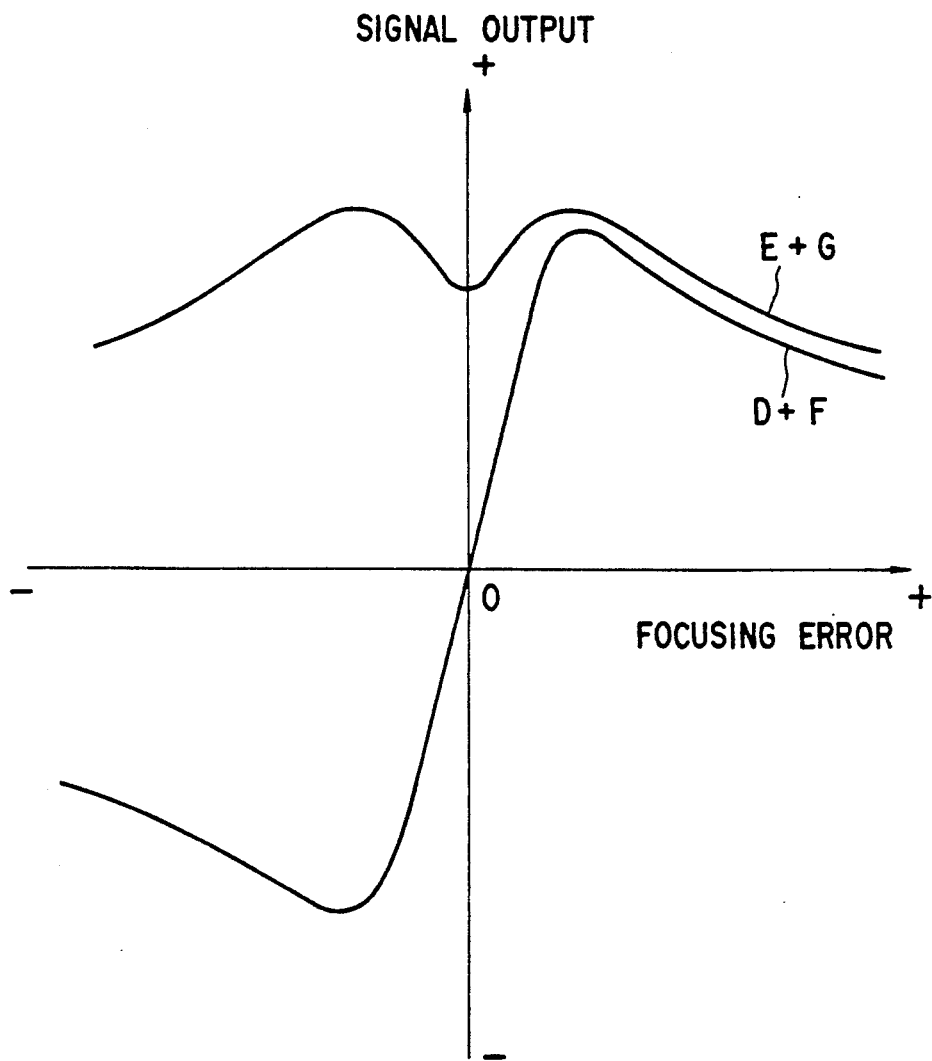
FIG. 14 is a graph showing changes in a focusing error signal and a sum, obtained by a processing circuit in FIG. 12.

FIG. 14 is a graph showing the focusing error detection characteristics and the characteristics of the sum of signals used for error detection in the embodiment, i.e., changes in output level of a main component (D+F) of the focusing error signal Sf and changes in output level of a sum (E+G) as a function of the focusing error. The focusing error detection characteristics in a just focusing condition are moderate and the detection range is widened as compared with the conventional method of double-knife-edge. It is also apparent that the amplitude of the sum (E+G) is increased as the amounts of light incident on the regions 22a to 22d and the regions 23a to 23d are increased in a just focusing condition. Furthermore, according to the embodiment, the focusing error signal output gradually decreases in level after it reaches its maximum value as compared with the conventional astigmatism detection method. Even if a defocusing amount from the focal position is large, the objective lens 6 can be easily set at the focal position.

According to this embodiment, the holographic optical element 9 is constituted by the two holograms 9D and 9E, and aberrations are provided for +1st order diffracted beams from the holograms 9D and 9E to be symmetrical about the region splitting line 9C, as shown in FIG. 10, thereby canceling the offset of a focusing error signal due to a positional shift, of a light beam incident on the holographic optical element 9, caused by movement of the objective lens 6 upon tracking or tilting of the optical disk 7. In order to clarify the above effect, the influence of a positional shift of a light beam incident on the holographic optical element 9 on the shapes of light beam spots on the detection surfaces of the photodetector 10 will be described below.

As the objective lens 6 is moved upon tracking, a positional shift of a light beam incident on the holographic optical element 9 occurs in a direction perpendicular to the region splitting line 9C of the holographic optical element 9. A positional shift in this direction can be corrected by only changing the ratio between the amounts of light beams incident on the two holograms 9D and 9E. Since the focusing error signal Sf is obtained by an arithmetic operation of (D/E)+(F/G), no offset is caused by this positional shift.

In contrast to this, if a positional shift of a light beam incident on the holographic optical element 9 occurs in a direction along the region splitting line 9C of the holographic optical element 9, the light beam spots on the detection surfaces 22 and 23 change in shape in the same manner as in the case of defocusing. For example, if the amount of change in shape of a light beam spot on the detection surface 22 corresponds to that obtained when the optical disk 7 is near the objective lens 6, the amount of change in shape of a light beam spot on the detection surface 23 corresponds to that obtained when the optical disk 7 is apart from the objective lens 6. Therefore, the change is canceled by the arithmetic operations of the signals D and F using the equations (1).

FIG. 15 shows another arrangement of the photodetector 10 to be used in combination with the holographic optical element 9 shown in FIG. 9. This photodetector 10 is different from the one shown in FIG. 11 in that the regions 22a and 22b of the detection surface 22 are replaced with a non-split region 22e, and the regions 23c and 23d of the detection surface 23 are replaced with a non-split region 23e. Note that the regions 22c and 22d of the detection surface 22 and the regions 23a and 23b of the detection surface 23 in FIG. 11 may be designed as non-split regions.

As shown in the block diagram of FIG. 16, outputs from the photodetector 10 in FIG. 15 are input to a processing circuit 15 through an amplifier 14. A focusing error signal Sf, a tracking error signal St, and a reproduced information signal Si are generated by the processing circuit 15. If output signals from the regions 22e and 23e are respectively represented by B5 and C5, the signals Sf, St, and Si are obtained by the following equations (2):

$$Sf = (B4 - B3)/C5 + (C1 - C2)/B5$$

$$St = C5 - B5$$

$$Si = A \qquad (2)$$

The processing circuit 15 shown in FIG. 16 is simpler than the one shown in FIG. 12. Although dividers in the processing circuit 15 in FIG. 16 are used only for the arithmetic calculation with respect to the focusing error signal Sf, these dividers may also be used to calculate the tracking error signal St by dividing (C5−B5) by (C5+B5). With this calculation, changes in gain of a tracking control signal with changes in amount of light in a recording operation can be suppressed.

In the above-described case, the tracking error signal St is generated when the region splitting line 9C of the holographic optical element 9 is parallel to the groove 19 in the optical disk 7. In contrast to this, if the region splitting line 9C is perpendicular to the groove 19, the tracking error signal St is generated by the following equations (3):

$$H = (B1 + B4) + (C1 + C4)$$

$$I = (B2 + B3) + (C2 + C3)$$

$$St = H - I \qquad (3)$$

Note that the tracking error signal St may be obtained by dividing (H−I) by (H+I). In both the arrangements shown in FIG. 11 and 15, the independent detection surface 21 is formed to detect the reproduced information signal Si. However, other arrangements may be employed. For example, the diffraction efficiency of the holographic optical element 9 is increased to reduce the amount of light which is transmitted therethrough without undergoing diffraction, thereby detecting the reproduced information signal Si on the basis of the total sum of output signals from the detection surfaces 22 and 23. In this arrangement, the detection surface 21 can be omitted.

Third Embodiment

A holographic optical element 9 shown in FIG. 17 has two holograms 9F and 9G split by a region splitting line 9C. When viewed from a direction parallel to the region splitting line 9C, both the grating configurations of these holograms 9F and 9G exhibit linear patterns, with the grating elements arranged at equal intervals, near the center of the element 9, whereas, at the peripheral portion, the configuration of the hologram 9F exhibits a pincushion-like shape, and that of the hologram 9G exhibits a barrel-like shape. Note that the difference between the grating configurations of the holograms 9F and 9G represents the difference between phase transfer functions provided by the holographic optical element 9, and that the holograms 9F and 9G have opposite phase transfer functions. Since both diffracted beams from the holograms 9F and 9G exhibit azimuths along the region splitting line 9C, the grating pitch of the hologram 9F is set to be smaller than that of the hologram 9G in order to detect the respective diffracted beams upon separating them.

FIG. 18 shows the shape of only the aberration components of the phase transfer functions, provided by the holographic optical element 9 in FIG. 17, with contour lines. As is apparent from FIG. 18, this shape corresponding to that of an optical element, obtained when the same function as that of the holographic optical element 9 is realized by a glass block or the like, is very complicated.

Figure 19:
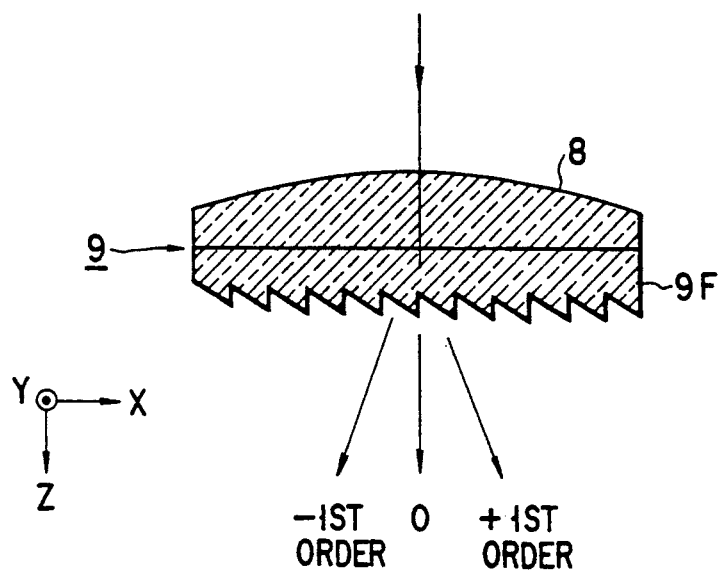
FIG. 19 is a sectional view showing the sectional shape of the holographic optical element in FIG. 17.

The sectional shape of the holographic optical element 9 shown in the plan view of FIG. 17 will be described next. As will be described later, in this embodiment, only +1st order diffracted beams are detected by a photodetector 10, and arithmetic operations with respect to various signals are performed on the basis of the detected beams. Therefore, it is preferable that all light beams incident on the holographic optical element 9 be +1st order diffracted beams. In order to obtain the closest effect to this requirement, the sectional shape of the holographic optical element 9 is formed into a blazed hologram, as shown in FIG. 19.

Provided that the refractive index of the holographic optical element 9 is represented by n; the height of each blazed grating element, h; and the wavelength of a light source, λ, the values of n and h are set to satisfy the following equation (4) to maximize the diffraction efficiency with respect to +1st order, thereby allowing a light beam reflected by an optical disk 7 to be guided to the photodetector 10 with the maximum efficiency.

$$h = +/(n-1) \qquad (4)$$

FIG. 20 shows the arrangement of the photodetector 10 to be used in combination with the holographic optical element 9 described with reference to FIGS. 17 to 19. The photodetector 10 in FIG. 20 has two two-split detection surfaces 31 and 32. The detection surface 31 is arranged to detect light diffracted by the hologram 9F (see FIG. 19) of the holographic optical element 9. The detection surface 32 is arranged to detect light diffracted by the hologram 9G. The detection surfaces 31 and 32 are respectively split into regions 31a and 31b, and 32a and 32b by partition lines 31c and 32c substantially coinciding with the region splitting line 9C of the holographic optical element 9.

Provided that outputs from the regions 31a, 31b, 32a, and 32b of the two-split detection surfaces 31 and 32 are respectively represented by A, B, C, and D, the signals A, B, C, and D are input to a processing circuit 15 through an amplifier 14, as shown in the block diagram of FIG. 21. This processing circuit 15 incorporates dividers to obtain signals by suppressing changes in gain of a control signal due to changes in amount of reflected light, generated when a light beam crosses a groove 19 in the optical disk 7, or changes in amount of light in a recording operation. Note that a focusing error signal Sf, a tracking error signal St, and a reproduced information signal Si are obtained by the following equations (5):

$$Sf = [(A-B)/(A+B)] + [(C-D)/(C+D)]$$

$$Si = (A+B+C+D)$$

$$St = (A+B) - (C+D) \qquad (5)$$

FIGS. 22A to 22C show changes in shape of a light beam spot on each detection surface of the photodetector 10 in a case wherein a light beam is radiated on the holographic optical element 9 having the two holograms 9F and 9G shown in FIG. 17, while the relative position between an objective lens 6 and the optical disk 7 is changed. Referring to FIGS. 22A to 22C, a light beam spot is expressed as a collection of dots, and the density of dots corresponds to the light intensity. FIG. 22B shows a just focusing condition, in which the shapes of light beam spots on the two-split detection surfaces 31 and 32 are symmetrical about the partition lines (i.e., line-symmetrical). It is easily expected from FIG. 18 that the light beam spots on the two-split detection surfaces 31 and 32 have such shapes.

The focusing state of a light beam on a line perpendicular to the region splitting line 9 of the holographic optical element 9 will be considered here. At a position near the center of the light beam, a convergent light beam conforming to the convergent effect of a converging lens 8 is formed, because the holographic optical element 9 has no focusing effect. However, at a position separated from the center of the light beam, the holographic optical element 9 exhibits a lens effect such as a convergent or divergent effect. Such a lens effect is enhanced with an increase in distance from the center of the light beam. With the above-described focusing effect, light beams located before and after an in-focus state are formed on the same plane at the focal position of the converging lens 8. Therefore, the respective beam spots have the shapes shown in FIG. 22B. In order to improve their symmetry, a certain degree of a lens effect is preferably kept along the region splitting line 9C of the holographic optical element 9.

FIG. 22A shows the states of light beam spots in a case wherein the objective lens 6 is at a position near the optical disk 7. More specifically, as the light beam spots on the regions 31b and 32b of the two-split detection surfaces 31 and 32 are gradually moved to the regions 31a and 32a the light beam spots on the regions 31a and 32a are gradually increased in size. FIG. 22C shows the states of light beam spots in a case wherein the objective lens 6 is set apart from the optical disk 7. In this case, as shown in FIG. 22C, changes in light beam spot occur conversely with respect to the case shown in FIG. 22A.

As described above, providing that output signals corresponding to the regions 31a, 31b, 32a, and 32b of the two-split detection surfaces 31 and 32 are represented by A, B, C, and D, the following equation of equations (5) is performed to obtain the focusing error signal Sf, which is at the zero level in a just focusing condition, and whose level and polarity change in accordance with the defocusing amount and the defocusing direction from the focal position of the objective lens 6.

$$Sf = [(A-B)/(A+B)] + [(C-D)/(C+D)]$$

In addition, since light beam spots on the two-split detection surfaces 31 and 32 widely spread in a just focusing condition shown in FIG. 22B, the amounts of light which is incident on the non-detecting regions on the partition lines 31c and 32c and is not detected are decreased. Furthermore, since the shape of each light beam spot is symmetrical about a corresponding one of the partition lines 31c and 32c (i.e., line-symmetrical), it is not easily influenced by the groove 19 in the optical disk 7.

Figure 23:
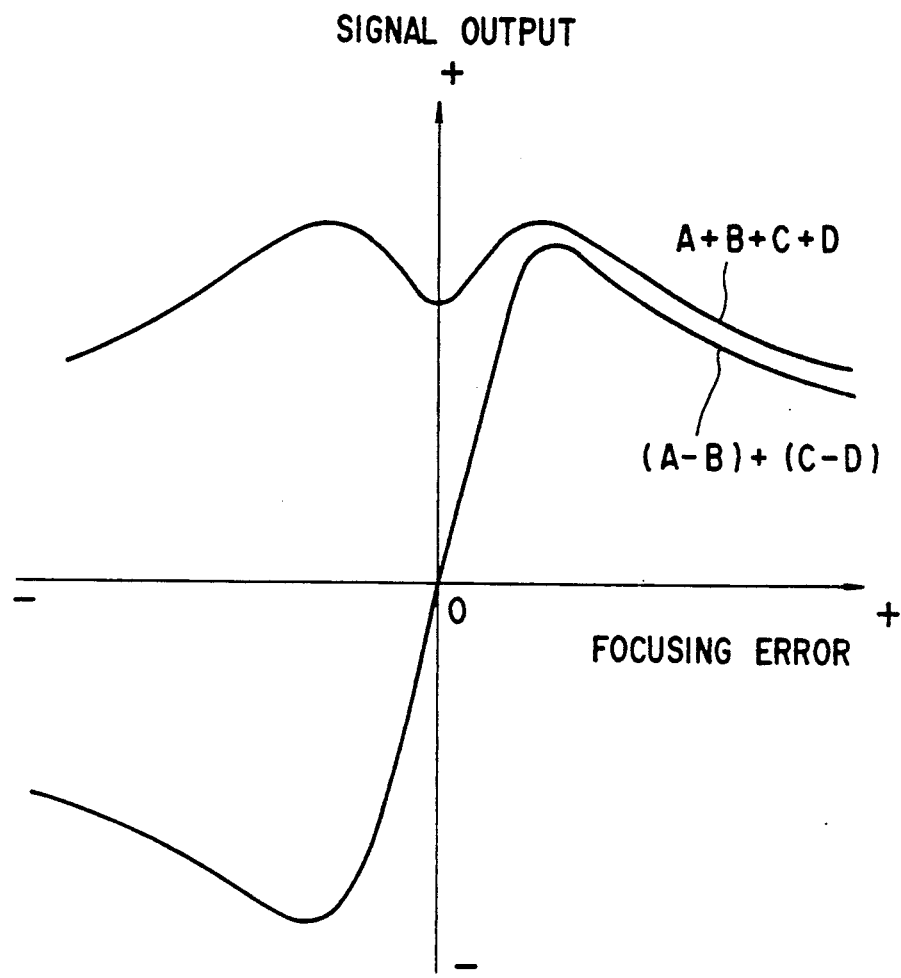
FIG. 23 is a graph showing changes in a focusing error signal and a reproduced information signal, obtained by a processing circuit in FIG. 21.

FIG. 23 is a graph showing the detection characteristics of a focusing error signal and a reproduced information signal in this embodiment. More specifically, the graph shows changes in a main component $(A-B)+(C-D)$ of the focusing error signal Sf and in the reproduced information signal $Si=(A+B+C+D)$ as a function of the focusing error. As is apparent from FIG. 23, the focusing error detection characteristics in a just focusing condition are moderate and the detection range is widened as compared with the conventional method of double-knife-edge. It is also apparent that the amplitude of the reproduced information signal Si is increased as the amounts of light incident on the two-split detection surfaces 31 and 32 are increased in a just focusing condition. Furthermore, according to the embodiment, since the focusing error signal Sf gradually decreases in level after it reaches its maximum value as compared with the conventional astigmatism detection method, even if a defocusing amount from the focal position is large, the objective lens 6 can be easily set at the focal position.

According to this embodiment, aberrations caused when light beams pass through the two holograms 9F and 9G of the holographic optical element 9 are provided to be point-symmetrical about the optical axis as an origin (see FIG. 18), thus canceling the offset of a focusing error signal, caused by a positional shift of a light beam incident on the holographic optical element 9 due to movement of the objective lens 6 upon tracking or tilting of the optical disk 7. In order to clarify the above-described effect, the influence of a positional shift of a light beam incident on the holographic optical element 9 upon the shapes of light beam spots on the detection surfaces of the photodetector 10 will be described below.

As the objective lens 6 is moved upon tracking, a positional shift of a light beam incident on the holographic optical element 9 occurs in a direction perpendicular to the region splitting line 9C of the holographic optical element 9. A positional shift in this direction changes only the ratio between the amounts of light beams incident on the two holograms 9F and 9G and hence causes no offset with respect to the focusing error signal Sf. However, such positional shift changes the detection sensitivity. This change in detection sensitivity is removed by the dividers arranged in the processing circuit 14.

If a positional shift of a light beam incident on the holographic optical element 9 occurs in a direction along the region splitting line 9C of the holographic optical element 9, the shapes of light beam spots on the detection surfaces 31 and 32 change in the same manner as in the case wherein defocusing is caused. If, for example, a change in shape of a beam spot on the detection surface 31 corresponds to that caused when the optical disk 7 is located near the objective lens 6, the amount of a change in shape of a beam spot on the detection surface 32 corresponds that obtained when the optical disk 7 is located far from the objective lens 6. Therefore, offsets are caused with respect to the differences between output signals from the regions 31a and 31b, and 32a and 32b of the detection surfaces 31 and 32. However, since these offsets have opposite polarities, the focusing error signal Sf output from the processing circuit 15 exhibits a value representing that the offsets have canceled each other.

In this embodiment, the tracking error signal St is generated in a state wherein the region splitting line C of the holographic optical element 9 is parallel to the groove 19 in the optical disk 7. If, however, the region splitting line 9C is perpendicular to the groove 19, the tracking error signal St can be obtained by an arithmetic operation of $St=(A+D)-(B+C)$.

Fourth Embodiment

Figure 24:
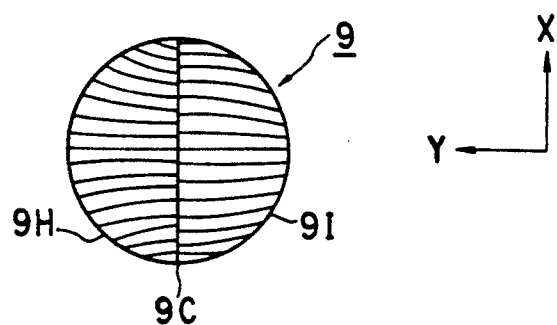
FIG. 24 is a plan view showing still another arrangement of the holographic optical element according to the present invention.

A holographic optical element 9 shown in the plan view of FIG. 24 has two holograms 9H and 9I split by a region splitting line 9C. The grating configurations of the holograms 9H and 9I are the same as those of the holograms 9F and 9G of the holographic optical element 9 shown in FIG. 17. Therefore, the stereoscopic representation of only the aberration components of phase transfer functions provided by this holographic optical element 9, shown in FIG. 25 with contour lines, has the same shape as that shown in FIG. 18.

Note, however, that the cross-section of the holographic optical element 9 shown in FIG. 24 is not blazed as shown in FIG. 19 but is formed into a rectangular shape having less phase difference. More specifically, the amount of light which is transmitted through the holograms 9H and 9I without undergoing diffraction is about 80% of that of incident light. Furthermore, in order to split 1st order diffracted beams into equal amounts of ±1st order diffracted beams, the sectional shapes of the holograms 9H and 9I constitute a stepped phase grating which is designed such that light undergoes an optical phase difference of $0.3\pi$ upon passing through the grating, provided that the duty ratio of the grating width to the grating pitch is ½.

FIG. 28 is a graph showing the diffraction efficiency for each order of diffraction as a function of the optical phase difference which light undergoes when it passes through the grating, provided that the duty of the holograms 9H and 9I is ½. Since the duty is ½, the diffraction efficiency for diffraction of an even order is zero. As is apparent from FIG. 28, the sectional shape of a hologram which allows about 80% of the amount of incident light to be transmitted through the holograms 9H and 9I without undergoing diffraction corresponds to a stepped phase grating which is designed such that light undergoes an optical phase difference of $0.3\pi$ when it passes through the grating.

Figure 25:
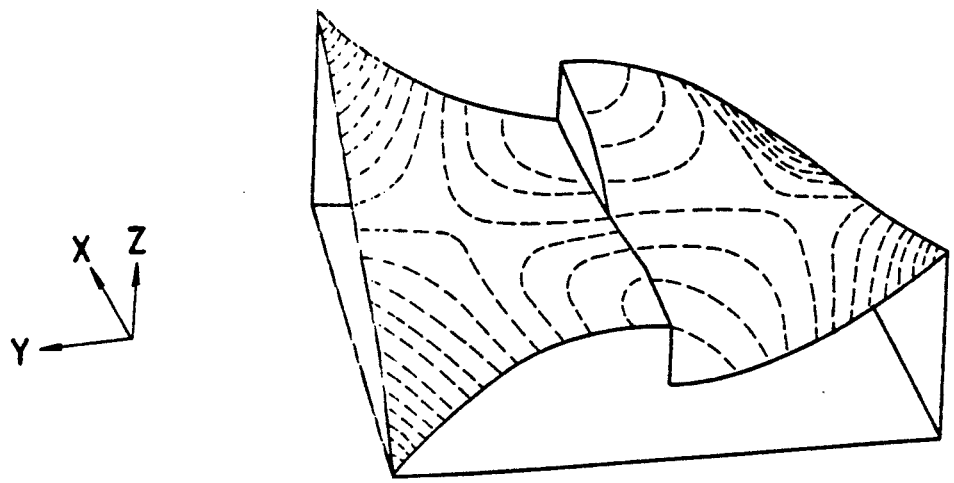
FIG. 25 is a perspective view stereoscopically showing phase change amounts provided by the holographic optical element in FIG. 24.
Figure 26:
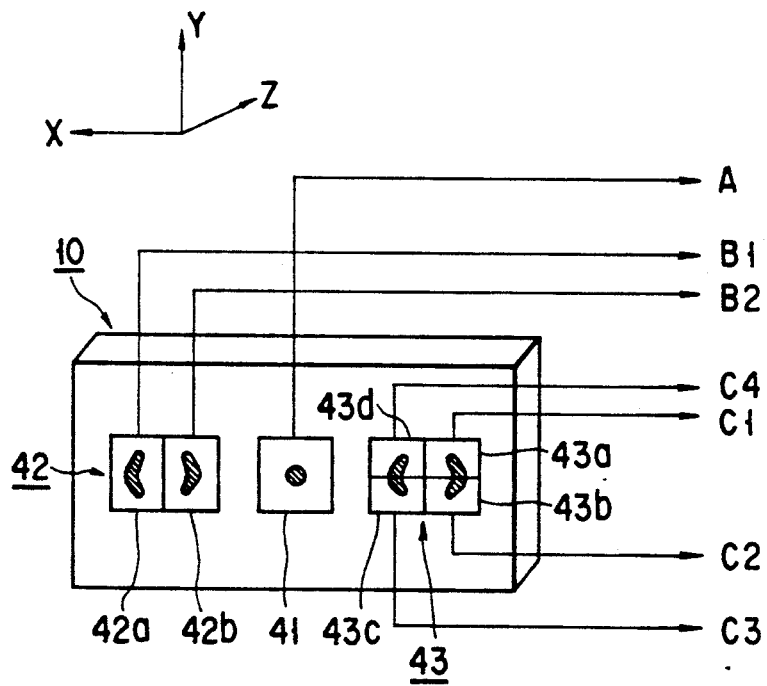
FIG. 26 is a view showing the arrangement of the detection surfaces of a photodetector to be used in combination with the holographic optical element in FIG. 24.

FIG. 26 shows an arrangement of a photodetector 10 to be used in combination with the holographic optical element 9 described with reference to FIGS. 24, 25, and 28. This photodetector 10 includes a detection surface 41 for detecting light which is transmitted through the holographic optical element 9 without undergoing diffraction, and a two-split detection surface 42 and a four-split detection surface 43 which are arranged on both the sides of the detection surface 41. The two-split detection surface 42 is arranged to detect a +1st order diffracted beam from the holographic optical element 9. The four-split detection surface 43 is arranged to detect a −1st order diffracted beam.

The detection surface 42 is split into two regions 42a and 42b to detect diffracted beams from the holograms 9H and 9I of the holographic optical element 9. The detection surface 43 is split into regions 43a to 43d by partition lines having the same azimuth as that of an image of a region splitting line 9C of the holographic optical element 9 and by splitting lines perpendicular thereto.

Assume that an output signal from the detection surface 41 is represented by A; output signals from the regions 42a and 42b of the two-split detection surface 42, B1 and B2; and output signals from the regions 43a, 43b, 43c, and 43d of the four-split detection surface 43, C1, C2, C3, and C4. All these signals are input to a processing circuit 15 through an amplifier 14. This processing circuit 15 incorporates dividers to obtain signals by suppressing changes in gain of a control signal due to changes in amount of reflected light, generated when a light beam crosses a groove 19 in an optical disk 7, or changes in amount of light in a recording operation.

In the processing circuit 15, a focusing error signal Sf, a tracking error signal St, and a reproduced information signal Si are obtained by the following equations (6):

$$Sf=(C1-C2)/B1+(C3-C4)/B2$$

$$St=B1-B2$$

$$Si=A \qquad (6)$$

Although the dividers in the arithmetic circuit 15 shown in FIG. 27 are used only for an arithmetic operation with respect to the focusing error signal Sf, these dividers may be used to calculate the tracking error signal St by dividing $(B1-B2)$ by $(B1+B2)$. With this modification, changes in gain of a tracking control signal with changes in amount of light in a recording operation can be suppressed.

Figure 29A:
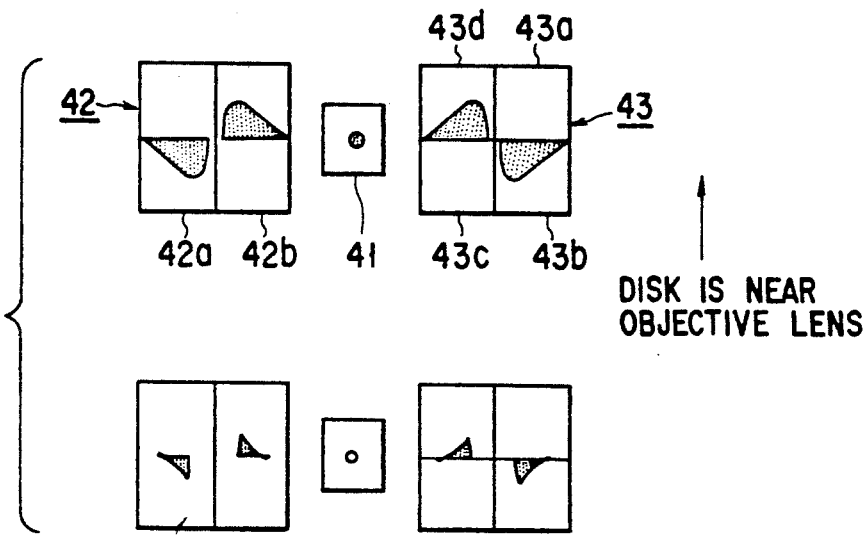
FIGS. 29A to 29C are projected views showing changes in shape of a light beam spot on each detection surface in FIG. 26 with respect to focusing errors.
Figure 29B:
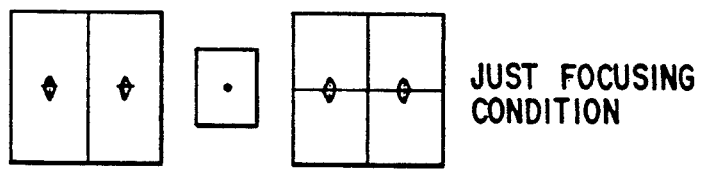
Figure 29C:
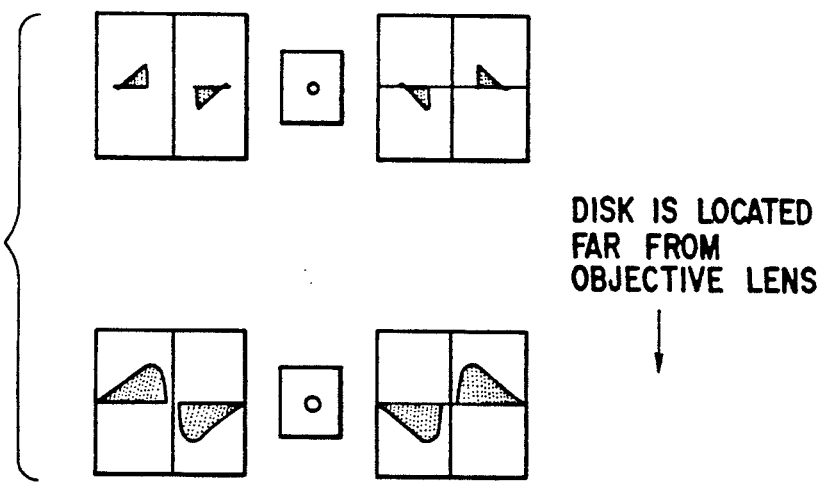

FIGS. 29A to 29C show changes in shape of a light beam spot on each detection surface of the photodetector 10 in a case wherein a light beam is radiated on the holographic optical element 9 having the two holograms 9H and 9I shown in FIG. 24, while the relative position between an objective lens 6 and the optical disk 7 is changed. Referring to FIGS. 29A to 29C, a light beam spot is expressed as a collection of dots, and the density of dots corresponds to the light intensity. FIG. 29B shows a just focusing condition, in which the shapes of light beam spots on the detection surfaces 43 are symmetrical about the partition lines. It is easily expected from FIG. 25 that the light beam spots on the detection surface 43 have such shapes.

A focusing effect on a light beam on a line perpendicular to the region splitting line 9C of the holographic optical element 9 will be considered here. At a position near the center of the light beam, a convergent light beam conforming to the convergent effect of a converging lens 8 is formed, because the holographic optical element 9 has no focusing effect. However, at a position separated from the center of the light beam, the holographic optical element 9 exhibits a lens effect such as a convergent or divergent effect. Such a lens effect is enhanced with an increase in distance from the center of the light beam. With the above-described focusing effect, light beams located before and after an in-focus state are formed on the same plane at the focal position of the converging lens 8. Therefore, the respective beam spots have the shapes shown in FIG. 29B. In order to improve their symmetry, a certain degree of a lens effect is preferably kept along the region splitting line 9C of the holographic optical element 9.

FIG. 29A shows the states of light beam spots in a case wherein the objective lens 6 is at a position near the optical disk 7. On the regions 43a and 43c of the four-split detection surface 43, the light beam spots move in opposite directions, and the light beam spots on the regions 43b and 43d gradually increase in size.

In contrast to FIG. 29A, FIG. 29C shows the states of light beam spots in a case wherein the objective lens 6 is set apart from the optical disk 7. In this case, changes in light beam spot occur conversely with respect to the case shown in FIG. 29A.

Therefore, when the processing circuit 15 in FIG. 27 performs an arithmetic operation based on the equations (6), it can obtain the focusing error signal Sf, which is at the zero level in the just focusing condition shown in FIG. 29B, and whose level and polarity change in accordance with the defocusing amount and the defocusing direction from the focal position of the objective lens 6. In addition, since light beam spots on the detection surface 43 widely spread in the just focusing condition shown in FIG. 29B, the amounts of light which is incident on the non-detecting regions on the partition lines on the four-split detection surface 43 is not detected are decreased. Furthermore, since the shape of each light beam spot is symmetrical about a corresponding one of the partition lines, it is not easily influenced by the groove 19 in the optical disk 7.

FIG. 30 is a graph showing the focusing error detection characteristics in this embodiment. More specifically, the graph shows changes in a main component $(C1-C2)+(C3-C4)$ of the focusing error signal Sf and in the sum $(C1+C2+C3+C4)$ of signals, based on these signals, as a function of the focusing error. As is apparent from FIG. 30, the focusing error detection characteristics in a just focusing condition are moderate and the detection range is widened as compared with the conventional method of double-knife-edge. It is also apparent that the amplitude of the sum signal is increased as the amounts of light incident on the detection surface 43 are increased in a just focusing condition. Furthermore, according to the embodiment, since the focusing error signal gradually decreases in level after it reaches its maximum value as compared with the conventional astigmatism detection method, even if a defocusing amount from the focal position is large, the objective lens 6 can be easily set at the focal position.

Note that if the sectional shape of the holographic optical element 9 constitutes a stepped phase grating which provides an optical phase difference c, a photodetector 10 having detection surfaces shown in FIG. 31 may be employed. The photodetector 10 in FIG. 31 is equivalent to the one shown in FIG. 26 from which the detection surface 41 for detecting light which is transmitted through the holographic optical element 9 without undergoing diffraction is omitted. This photodetector 10 has a two-split detection surface 52 and a four-split detection surface 53. The two-split detection surface 52 is arranged to detect a +1st order diffracted beam from the holographic optical element 9. The four-split detection surface 53 is arranged to detect a −1st order diffracted beam.

The two-split detection surface 52 is split into regions 52a and 52b to detect diffracted light beams from the holograms 9H and 9I of the holographic optical element 9. The four-split detection surface 53 is split into regions 53a to 53d by partition lines having the same azimuth as that of an image of a region splitting line 9C of the holographic optical element 9 and by splitting lines perpendicular thereto.

Assume that output signals from the regions 52a and 52b of the two-split detection surface 52 are respectively represented by B1 and B2; and output signals from the regions 53a, 53b, 53c, and 53d of the four-split detection surface 53, C1, C2, C3, and C4. All these signals are input to a processing circuit 15 through an amplifier 14, as shown in the block diagram of FIG. 32. This processing circuit 15 incorporates dividers to obtain signals by suppressing changes in gain of a control signal due to changes in amount of reflected light, generated when a light beam crosses a groove 19 in an optical disk 7, or changes in amount of light in a recording operation. In this processing circuit 15, the focusing error signal Sf and the tracking error signal St can be obtained by arithmetic operations similar to the equations (6). In addition, the reproduced information signal Si is obtained by adding all the output signals.

Although the dividers in the processing circuit 15 shown in FIG. 31 are used only for an arithmetic operation with respect to the focusing error signal Sf, these dividers may be used to calculate the tracking error signal St by dividing $(B1-B2)$ by $(B1+B2)$. With this technique, changes in gain of a tracking control signal with changes in amount of light in a recording operation can be suppressed.

In each embodiment described above, the difference between diffracted light beams from a groove in an optical disk is detected to generate a tracking error signal. However, the present invention is not limited to this technique. For example, in an optical disk of a sample servo scheme in which embossed pits are formed in the recording surface of the optical disk to be alternately displaced from the track center by a predetermined amount (e.g., a ¼ track pitch) so as to form wobbled pits, a tracking error signal can be detected by sampling reproduced information signals at wobbled pit portions and comparing their signal amplitudes, instead of detecting the above-mentioned difference.

A method of forming the above-described holographic optical element 9 will be described below. The holographic optical element 9 used in the present invention is formed in such a manner that the aberration components of a phase transfer function constitute a function asymmetrical about an axis perpendicular to the main diffraction direction. More specifically, the diffraction direction of a light beam passing through one of the sides split by the axis perpendicular to the main diffraction direction is deflected toward one direction with respect to the main diffraction direction. On the other hand, the diffraction direction of a light beam passing through the other side is deflected toward the opposite direction to the above-mentioned direction with respect to the main diffraction direction. If the holographic optical element 9 having the above-described arrangement is used, detection characteristics obtained when a focusing error occurs in the "+" direction and those obtained when a focusing error occurs in the "−" direction become symmetrical. As a result, detection characteristics with good linearity can be obtained. In addition, even if changes in diffraction direction occur due to wavelength variations in a just focusing condition, no light beam cross the partition lines of the photodetector. Therefore, no offset is caused.

In the perspective view of FIG. 33, which shows the aberration components of the phase transfer function of the holographic optical element 9, x- and y-axes are coordinate axes on the surface of the holographic optical element, and the main diffraction direction corresponds to the positive or negative direction of the y-axis. The aberration components of the phase transfer function define a function asymmetrical about the x-axis. That is, the amount of advance in phase at a point (x,y) is equal to that at a point (x,-y), and these phase advance amounts have opposite polarities. In addition, the value of the phase transfer function is constant at the respective points on the x-axis, and light diffracted at these points in properly deflected toward the y-axis direction. In practice, however, a grating pattern to be formed on the holographic optical element 9 is a pattern constituted by contour lines provided at intervals corresponding to the wavelength of light used according to this phase transfer function.

FIG. 34 is a plan view illustrating a grating pattern of an actual holographic optical element. In practice, focusing errors are detected by using only a portion on one half side of the y-axis. In an optical system for detecting focusing errors, the partition lines of the split detection surfaces of a photodetector are directed toward the y-axis so that light beams deflected in the y-axis direction come into contact with the splitting lines. As is easily understood from the contour line pattern, the diffraction direction of a light beam passing through the upper half of the holographic optical element is deflected so that the light beam reaches the left side of the split type photodetector. In contrast to this, the diffraction direction of a light beam passing through the lower half of the holographic optical element is deflected so that the light beam reaches the right side of the photodetector. This deflection direction is continuously and gradually changed from the upper portion to lower portion of the holographic optical element, resulting in excellent characteristics.

Figure 35:
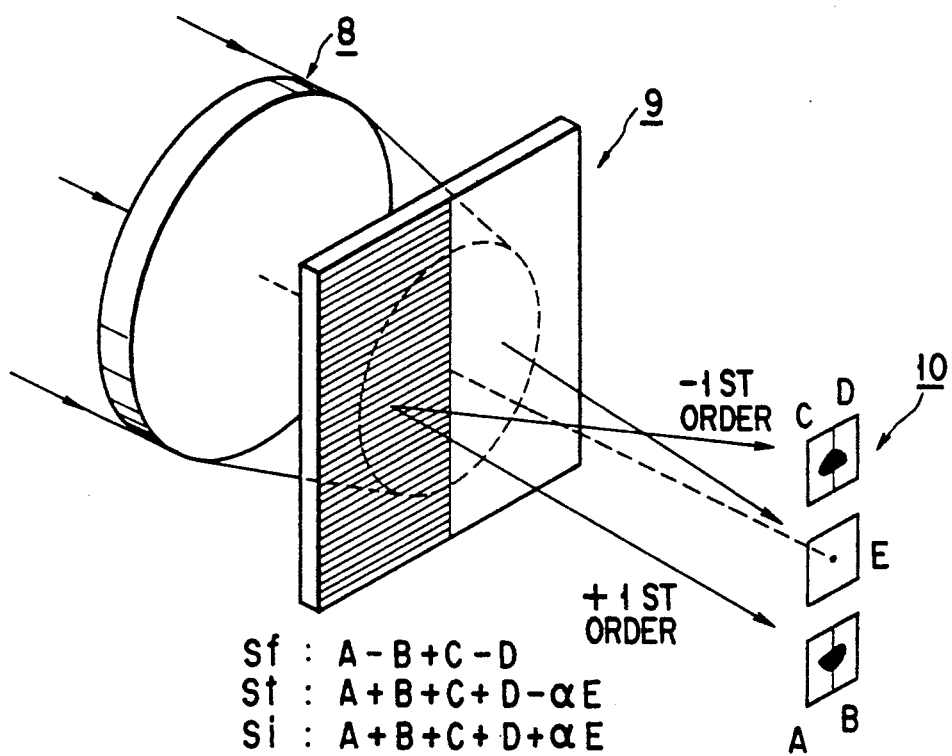
FIG. 35 is a view showing the arrangement of the holographic optical element in FIG. 34 and a split type photodetector to be used in combination therewith.

FIG. 35 shows the positional relationship between the holographic optical element 9 and the photodetector 10. The photodetector 10 detects the difference between light signals radiated on the left and right sides of each partition line. Light beams passing through the upper or lower sides of the x-axis of the holographic optical element 9 are radiated on the right or left side of the partition line, but the side on which the light beams are radiated is not changed to the other side with variations in wavelength. That is, the above-mentioned detecting operation is substantially free from the influence of wavelength variations.

Assume that a light beam passing through the point (x,y) is radiated on the partition line when a focusing error amount is given by Δ. In this case, when a focusing error amount is −Δ, a light beam passing through the point (x,−y) is radiated on the partition line. Because of this symmetry, excellent detection characteristics such as linearity can be realized in terms of a focusing error detecting system. In addition, with regard to a beam shift in the x-axis direction, excellent characteristics, e.g., that an offset is not easily superposed on a focusing error signal, can be realized.

Several practical methods of designing the phase transfer function having the above-described characteristics can be presented. As a simple method of obtaining good characteristics with a grating pattern exhibiting excellent symmetry, a least square fitting method is available. In this method, a function including an unknown parameter is assumed as a phase transfer function $\phi(x,y)$, and the unknown parameter is determining by least square fitting.

For example, $C(i)$ ($i=1, \ldots, 14$) is assumed as an unknown parameter, and a function defined by the following polynomial is considered:

$$\phi(x,y) = (2\pi/\lambda)\{C(1)x + C(2)x^2 + C(3)x^3 + C(4)x^4 + C(5)y + C(6)xy + C(7)x^2y + C(8)x^3y + C(9)y^2 + C(10)xy^2 + C(11)x^2y^2 + C(12)y^3 + C(13)xy^3 + C(14)y^4\} \quad (7)$$

In the least square fitting method, target points are respectively assigned, as design parameters, to several representative light beams.

Note that the positional relationship between the converging lens 8, the holographic optical element 9, and the photodetector 10 can be variously changed. For example, the converging lens 8 may be arranged between the holographic optical element 9 and the photodetector 10. In addition, the converging lens 8 may be constituted by a concave or convex lens.

Figure 36A:
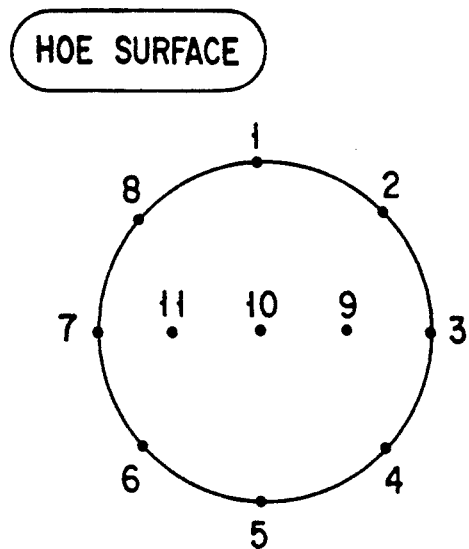
FIGS. 36A and 36B are views showing a method of setting target points in the design of a phase transfer function.
Figure 36B:
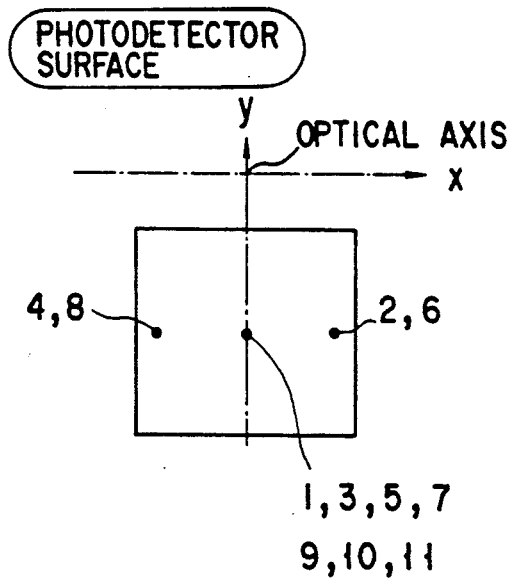

In a method of setting target points in the design of a phase transfer function, shown in FIGS. 36A and 36B, target points 1 to 11 are set on a detection surface with respect to 11 light beams passing through a holographic optical element. Referring to FIGS. 36A and 36B, reference numerals attached to the respective light beams indicate the correspondence between the points of the holographic optical element, through which the light beams pass through, and the target points. The square of the distance between each point at which a light beam reaches, obtained by a calculation of light beam tracking, and a corresponding target point is calculated. A parameter which minimizes the sum of the squares is then determined as the value of an unknown parameter. The calculation of light beam tracking can be easily performed by a general technique based on geometric optics. In addition, the least square fitting method can be performed by a computer using a general calculation program.

Other Embodiments

Other embodiments of the optical head according to the present invention will be described below.

FIG. 37 shows another arrangement of the optical system for focusing error detection in the optical head. More specifically, this system includes a multi-functional optical element 61 having functions equivalent to those of the converging lens 8 and the holographic optical element 9 in FIG. 1 described above, and a photodetector 62. A light beam reflected by the optical disk 7 in FIG. 1 passes through the objective lens 6 and is separated from the optical path of the incident light by the beam splitter 4 so as to be incident on the multi-functional optical element 61. The multi-functional optical element 61 splits the incident light into light beams, each having a semicircular cross-section, and focuses them onto different positions. In addition, the multi-functional optical element 61 provides mixed aberrations for the two split convergent light beams to let them have shapes which are symmetrical about the partition lines of the two-split detection surfaces of the photodetector 62, when a light spot on the recording surface of the optical disk 7 exhibits a just focusing condition. The photodetector 62 has a pair of two-split detection surfaces. When a processing circuit (not shown) performs arithmetic processing on signals from the detection surfaces of the photodetector 62 in the same manner as described above, a focusing error signal can be obtained.

FIG. 38 expresses each function of the multi-functional optical element 61 by an independent element in order to clarity its functions. More specifically, the multi-functional optical element 61 consists of the functions of the following elements: a converging lens 71 constituted by a convex lens, a light beam splitting element 72 constituted by a wedge prism for splitting a light beam into light beams having semicircular cross-sections and deflecting them to different positions, and a mixed aberration element 73 for providing asymmetrical mixed aberrations for the two split light beams. As shown in FIG. 38, the elements 71 to 73 having these functions may be sequentially arranged to be close to each other. However, an integral arrangement of these elements is preferable in terms of handling and reliability.

Figure 39:
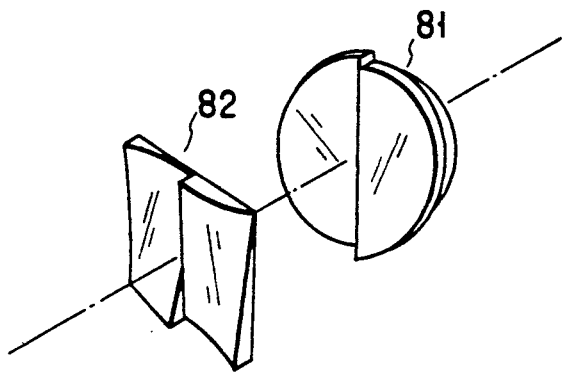
FIG. 39 is a perspective view showing the arrangement of another multi-functional optical element in FIG. 37.
Figure 40:
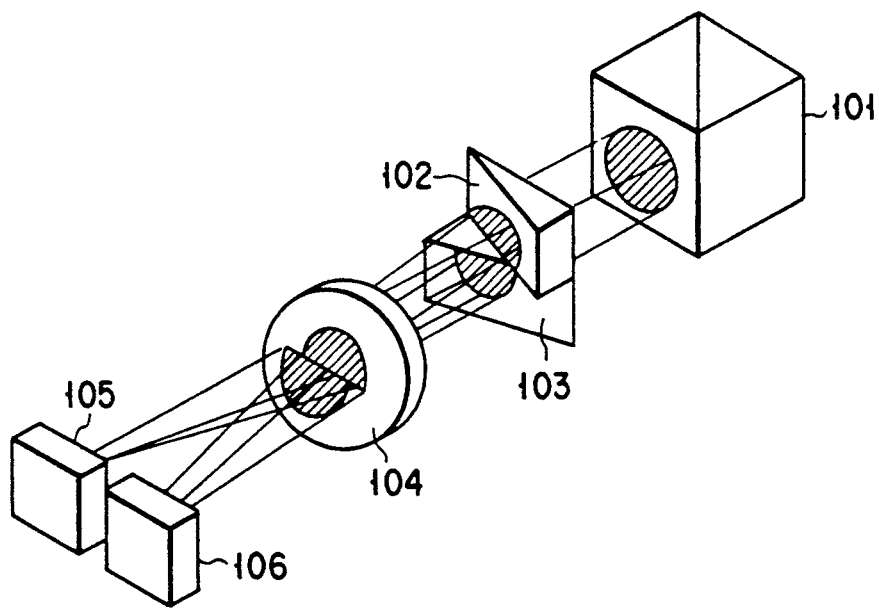
FIG. 40 is a perspective view showing the arrangement of a focusing error detecting apparatus based on the conventional method of double-knife-edge.

FIG. 39 shows another arrangement of the multi-functional optical element 61. In this arrangement, a converging lens 81 is split into two semicircular portions, and the split portions are slightly shifted from each other along a splitting line, thus obtaining a focusing function and a light beam splitting function. The multi-functional optical element 61 is constituted by this converging lens 81 and a mixed aberration element 82 equivalent to the element 73 in FIG. 38. In this case, the elements 81 and 82 having these functions may also be sequentially arranged to be close to each other. However, an integral arrangement of these elements is preferable in terms of handling and reliability.

As has been described above, according to the present invention, in a just focusing condition, the photodetection efficiency at each split detection surface of the photodetector is high, and the amount of incident light is large. In addition, the degree of freedom in setting of a focusing error detection range is high, thereby allowing stable focusing error detection with respect to positional adjustment errors and tracking errors in an optical system.

In addition, if a holographic optical element is used, a focusing error detecting system can be realized by a small number of optical elements. Therefore, a reduction in size and weight of an optical head portion can be easily achieved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head comprising:
    a light source for emitting a light beam;
    an objective lens for focusing and radiating the light beam emitting from said light source onto a recording surface of an optical memory;
    a converging lens for focusing the light beam reflected by the recording surface and passing through said objective lens;
    a holographic optical element arranged to be adjacent to said converging lens and having a hologram formed in at least one region of two regions split by a region partition line crossing orthogonally an optical axis of said converging lens;
    a photodetector having first and second split detection surfaces, each split by a partition line having a same azimuth as that of the region partition line of said holographic optical element, for detecting light beams diffracted by said hologram; and
    processing means for calculating a focusing error of said objective lens with respect to the recording surface on a basis of output signals from said photodetector,
    wherein said holographic optical element has characteristics in which spot shapes of said reflected light beams projected on the split detection surfaces are respectively symmetrical about the partition lines, when said objective lens is in a just focusing condition with respect to the recording surface, and when said objective lens is in a defocusing condition, the spot shapes deviate from positions of line symmetry in accordance with a defocusing amount.

2. An optical head according to claim 1, wherein the two regions of said holographic optical element are constituted by a first region through which the light beam passes, and a second region having a predetermined grating pitch which is formed along an axis direction vertical to said partition line and provides a predetermined spot shape required to detect the focusing error,
    the first split detection surface and the second split detection surface of said photodetector respectively detect a +1st order diffracted beam and a −1st order diffracted beam diffracted by said second region of said holographic optical element.

3. An optical head according to claim 1, wherein said holographic optical element has first and second holograms respectively formed in the two regions split by the region partition line, said first and second holograms having a phase transfer function for providing aberrations symmetrical about the region partition line, a same diffraction angle, and diffraction azimuths symmetrical about the region partition line,
    the first split detection surface of said photodetector detects a detecting light beam diffracted by said first hologram of said holographic optical element, and
    the second split detection surface of said photodetector detects diffracted beams of a different sign and a same order obtained by said second hologram of said holographic optical element.

4. An optical head according to claim 1, wherein said converging lens is constituted by a concave or convex lens arranged between said holographic optical element and said photodetector and having the optical axis crossing the region partition line of said holographic optical element at a position near a middle of the region partition line, said converging lens projecting the light beam, diffracted by said holographic optical element, at a predetermined position on said photodetector.

5. An optical head according to claim 1, wherein the region partition line formed on said holographic optical element is parallel to a direction in which a groove is formed in the recording surface of said optical memory.

6. An optical head according to claim 1, wherein the region partition line formed on said holographic optical element is perpendicular to a direction in which a groove is formed in the recording surface of said optical memory.

7. An optical head according to claim 1, wherein said holographic optical element has a planar configuration designed such that grating elements have a predetermined grating pitch and linearly extend at substantially equal intervals at a middle portion of the region partition line, and the grating pitch is increased or decreased as the grating elements extend toward a peripheral portion of the region partition.

8. An optical head, comprising:
light source for emitting a light beam;
an objective lens for focusing and radiating the light beam emitted from said light source onto a recording surface of an optical memory;
a multi-functional optical element for receiving light reflected by the recording surface, including:
a focusing element;
a beam splitting element for converting the light into two light beams, and
a mixed aberration element which receives the two light beams from the beam splitting element and outputs two output light beams which have passed through the mixed aberration element;
a photodetector having first and second split detection surfaces, each split by predetermined partition lines, for respectively detecting the two output light beams, output from said mixed aberration element of said multi-functional optical element; and
arithmetic means for calculating a focusing error of said objective lens with respect to the recording surface on the basis of output signals from said photodetector.

9. An optical head comprising:
a light source for emitting a light beam;
an objective lens for focusing and radiating the light beam emitting from said light source onto a recording surface of an optical memory;
a converging lens for focusing the light beam reflected by the recording surface and passing through said objective lens;
a holographic optical element arranged to be adjacent to said converging lens and having a hologram formed in at least one region of two regions split by a region partition line crossing orthogonally an optical axis of said converging lens;
a photodetector having first and second split detection surfaces, each split by a partition line having a same azimuth as that of the region partition line of said holographic optical element, for detecting light beams diffracted by said hologram; and
processing means for calculating a focusing error of said objective lens with respect to the recording surface on a basis of output signals from said photodetector, wherein said holographic optical element has characteristics in which spot shapes of said reflected light beams projected on the split detection surfaces are respectively symmetrical about the partition lines, when said objective lens is in a just focusing condition with respect to the recording surface, and when said objective lens is in a defocusing condition, the spot shapes deviate from positions of line symmetry in accordance with a defocusing amount;

wherein said holographic optical element has first and second holograms respectively formed in the two regions split by the region partition line, said first and second holograms having a phase transfer function for providing aberrations which are point-symmetrical with the optical axis as an origin, and having different diffraction angles, and the first and second split detection surfaces of said photodetector detect diffracted beams of a same sign and order obtained by said first and second holograms.

10. An optical head, comprising:
a light source for emitting a light beam;
an objective lens for focusing and radiating the light beam emitting from said light source onto a recording surface of an optical memory;
a converging lens for focusing the light beam reflected by the recording surface and passing through said objective lens;
a holographic optical means for receiving the focused light beam from the converging lens and having a hologram formed in at least one region of two regions split by a region partition line;
a photodetector having a first and a second detection surfaces, both the first and the second detection surfaces split by partition lines, said photodetector means for detecting the light beams from said holographic optical means; and
processing means for calculating a focusing error of said objective lens with respect to the recording surface using output signals from said photodetector means, said focusing error is zero when the reflected light beams projected on the split detection surfaces are symmetrical about the partition lines, and said focusing error increases as the reflected light beams projected on the split detection surfaces deviate from positions which are symmetrical about the partition lines.

11. An optical head according to claim 10 wherein the holographic optical means comprises a holographic optical element having only two regions, corresponding to the two regions of the holographic optical means, one region of the holograph optical element has a diffraction means for diffracting a +1st order diffraction beam and a −1st order diffraction beam from the light beam from the converging lens, the other region of the two regions of the holographic optical element transmits the light beam from the converging lens without diffracting it, and the region partition line of the holographic optical means is a straight line, which divides the holographic optical element.

12. An optical head according to claim 11, wherein the photodetector means has a non-split detection surface between the first and second detection surfaces, the detection surfaces producing signals which correspond to an intensity of a light beam from the holographic optical means which projects thereon, the non-split detection surface producing signal B, an upper portion of the first detection surface producing signal C1, a lower portion of the first detection surface producing signal A1, an upper portion of the second detection surface producing signal C2, and a lower portion of the second detection surface producing signal A2.

13. An optical head according to claim 12 wherein the processing means calculates the focusing error to be the sum of the signals A1 and A2 minus the sum of the signals C1 and C2.

14. An optical head according to claim 12 wherein the processing means also calculates a tracking error of said objective lens by adding the sum of the signals A1 and A2 to the sum of the signals C1 and C2 and subtracting the B signal.

15. An optical head according to claim 12 wherein the processing means also calculates a data signal using the sum of the signals A1 and A2 added to the sum of the signals C1 and C2 added to the B signal.

16. An optical head according to claim 10 wherein the holographic optical means has only two regions, each of the two regions having a hologram, each of the holograms having a grating configuration such that grating elements linearly extend at equal intervals near a center portion in a direction parallel to the region splitting line but are distorted in a pincushion shape as they extend from a central portion of the holographic optical means to a peripheral portion of the holographic optical means, the grating elements of the holograms being symmetrical about the region splitting line.

17. An optical head according to claim 16, wherein the photodetector means has third and fourth detection surfaces, both the third and fourth detection surfaces split by partition lines, the photodetector means also having a fifth detection surface, the fifth detection surface surrounded by the first, second, third, and fourth detection surfaces such that the first detection surface is northwest relative to the fifth detection surface is, the second detection surface northeast relative to the fifth detection surface, the third detection surface is southeast relative to the fifth detection surface, the fourth detection surface is southwest relative to the fifth detection surface, the detection surfaces producing output signals indicating a strength of light beams incident upon the detection surfaces, an upper portion of the first detection surface producing signal C4, a lower portion of the first detection surface producing signal C3, an upper portion of the second detection surface producing signal B1, a lower portion of the second detection surface producing signal B2, an upper portion of the third detection surface producing signal B3, a lower portion of the third detection surface producing signal B4, an upper portion of the fourth detection surface producing signal C2, a lower portion of the fourth detection surface producing signal C1, and the fifth detection surface producing signal A.

18. An optical head according to claim 17 wherein the processing means determines a focusing error signal Sf equal to $(D/E)+(F/G)$ $$D=(B1-B2)+(C2-C1)$$

$$E=(B1+B2)+(C2+C1)$$

$$F=(B4-B3)+(C3-C4)$$

$$G=(B4+B3)+(C3+C4).$$

19. An optical head according to claim 16, wherein the photodetector means has a third, a fourth, and a fifth detection surface, the first detection surface southwest relative to the fifth detection surface, the second detection surface southeast relative to the fifth detection surface, the third detection surface northeast relative to the fifth detection surface, and the fourth detection surface northwest relative to the fifth detection surface, the detection surfaces producing output signals having strengths relative to a strength of a light beam incident on the detection surfaces, an upper portion of the first detection surface producing signal C2, a lower portion of the first detection surface producing signal C1, an upper portion of the second detection surface producing signal B, a lower portion of the second detection surface producing signal B4, the third detection surface producing signal B5, the fourth detection surface producing signal C5, and the fifth detection surface producing signal A.

20. An optical head according to claim 19, wherein the processing means calculates the focusing error to be Sf where:

$$Sf=(B4-B3)/C5+(C1-C2)/B5.$$

21. An optical head according to claim 10, wherein the holographic optical means diffracts only first order light beams of a single sign, the holographic optical means comprising blazed grating elements, the refractive index of the holographic optical means represented by n, each blazed grating element having a height h, and a wavelength of the light source being λ such that:

$$h=\lambda/(n-1),$$

the holographic optical means having a hologram formed in each of the two regions, when viewed from a direction parallel to the region splitting line, grating configurations of each hologram exhibit linear patterns with grating elements arranged at equal intervals near a center portion of the holographic optical means, at a peripheral portion of the holographic optical means, one region has a pincushion shape, and the other region has a barrel shape, the regions having opposite phase transfer functions, and a grating pitch of the hologram in the one region is smaller than a grating pitch of the hologram in the other region.

22. An optical head according to claim 10 wherein the photodetector means has only two split detection surfaces, an upper portion of the first detection surface produces signal a, a lower portion of the first detection surface produces signal B, an upper portion of the second detection surface produces signal D, and a lower portion of the second detection surface produces signal C, the upper portions of the first and second detection surfaces having heights which are substantially the same, and the lower portions of the first and second surfaces having heights which are substantially the same.

23. An optical head according to claim 22 wherein the processing means calculates the focusing error to be Sf where:

$$Sf=[(A-B)/(A+B)]+[(C-D)/(C+D)].$$

24. An optical head according to claim 10, wherein the holographicoptical means has a vertical plane constituting the region partition line, each region of the holographic optical means having a hologram formed therein, an eastern edge of one hologram touching the vertical plane at a substantially constant height along the vertical plane at a substantially constant height along the vertical plane, the one hologram having a southwest portion diminishing in height towards a southwest corner of the hologram, and a northwest portion increasing in height towards a northwest corner of the hologram, the other hologram having a western portion touching the vertical plane, a northwest portion of the other hologram having a larger height than the substantially constant height of the one hologram where it meets the vertical plane, and the other hologram having a southwest portion lower in height than the substantially constant height of the one hologram where the one hologram meets the vertical plane.

25. An optical head according to claim 24, wherein the second detection surface has a second partition line, orthogonal to the first partition line of the second detection surface, the second detection surface being divided into four regions, each region of the second detection surface producing an output signal corresponding to a strength of a light beam incident upon it, a northeast region producing signal C1, a southeast region producing signal C2, a southwest region producing signal C3, and a northwest region producing signal C4, the photodetector means further having a third detection surface located between the first and second detection surfaces, the third detection surface producing signal A in response to a strength of a light beam incident upon it, and the first detection surface having a west and an east region each region producing an output signal corresponding to a strength of a light beam incident upon it, a western portion producing signal B1, and an eastern portion producing signal B2.

26. An optical head according to claim 25, wherein the processing means calculates the focusing error Sf, where:

$$Sf=(C1-C2)/B1+(C3-C4)/B2.$$

27. An optical head according to claim 24, wherein the second detection surface has a second partition line, orthogonal to the first portion line of the second detection surface, the second detection surface being divided into four regions, each region of the second detection surface producing an output signal corresponding to a strength of a light beam incident upon it, a northeast region producing signal C1, a southeast region producing signal C2, a southwest region producing signal C3, and a northwest region producing signal C4, and the first detection surface having a west and an east region each region, each producing an output signal corresponding to a strength of a light beam incident upon it, a western portion producing signal B1, and an eastern portion producing signal B2.

28. An optical head according to claim 27, wherein the processing means calculates the focusing error Sf where:

$$Sf=[(C1-C2)/B1]+[(C3-C4)/B2].$$

29. An optical head according to claim 10, wherein the holographic optical means for receiving the focused light beam receives only a single light beam reflected from the recording surface through the converging lens, the holographic optical means consists of a holographic optical element having only two regions, the regions of the holographic optical element corresponding to the regions of the holographic optical means, a first region of the holographic optical element has a diffraction means for diffracting a plus first order diffraction beam and a minus first order diffraction beam from the light beam from the converging lens, a second region of the two regions of the holographic optical element transmits the light beam from the converging lens without diffracting the light beam, and the region partition line of the holographic optical means is a straight line which corresponds to a region partition line of the holographic optical element, the photodetector means has a nonsplit detection surface between the first and second detection surfaces for receiving non-diffracted light passed through the second region of the holographic optical means, the first detection surface for detecting the plus first order beam and the second detection surface for detecting the minus first order beam, the detection surfaces producing signals corresponding to an intensity of light beams from the holographic optical means which projects on the detection surfaces, the nonsplit detection surface producing signal B, an upper portion of the first detection surface producing signal C1, a lower portion of the first detection surface producing signal A1, an upper portion of the second detection surface producing signal C2, and a lower portion of the second detection surface producing signal A2.

30. An optical head according to claim 29, wherein the processing means calculates the focusing error Sf, the processing means also calculates a tracking error St, and the processing means also calculates an information signal Si where:

$$Sf=(A1-A2)-(C1+C2),$$

$$St=(A1+A2)+(C1+C2)-B, \text{ and}$$

$$Si=(A1+A2+C1+C2+B).$$

* * * * *